United States Patent
Kashiwagi

(10) Patent No.: US 7,911,638 B2
(45) Date of Patent: Mar. 22, 2011

(54) IMAGE PROCESSING APPARATUS, IMAGE PROCESSING METHOD, AND IMAGE PROCESSING PROGRAM

(75) Inventor: Masaki Kashiwagi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1057 days.

(21) Appl. No.: 10/742,309

(22) Filed: Dec. 18, 2003

(65) Prior Publication Data

US 2004/0165207 A1 Aug. 26, 2004

(30) Foreign Application Priority Data

Dec. 27, 2002 (JP) ................................. 2002-381463

(51) Int. Cl.
*G06F 15/00* (2006.01)
*G06F 3/12* (2006.01)
*H04N 1/00* (2006.01)

(52) U.S. Cl. ....... 358/1.16; 358/1.1; 358/1.18; 358/401; 358/402

(58) Field of Classification Search ................ 358/1.15, 358/1.16, 1.17, 3.24, 404, 401, 402, 474, 358/442, 446, 498, 403; 382/305
See application file for complete search history.

(56) References Cited

U.S. PATENT DOCUMENTS

| | | | | |
|---|---|---|---|---|
| 5,016,114 A | * | 5/1991 | Sakata et al. ................ | 358/404 |
| 5,901,278 A | * | 5/1999 | Kurihara et al. ............. | 358/1.15 |
| 5,966,219 A | * | 10/1999 | Mori ............................ | 358/442 |
| 6,040,920 A | * | 3/2000 | Ichiriki ........................ | 358/403 |
| 6,643,028 B1 | * | 11/2003 | Ogaki et al. .................. | 358/1.6 |
| 6,785,488 B2 | * | 8/2004 | Katsuyama .................. | 399/84 |
| 6,906,821 B1 | * | 6/2005 | Hanazono et al. ........... | 358/1.16 |
| 6,961,139 B1 | * | 11/2005 | Kita et al. .................... | 358/1.15 |
| 6,980,702 B2 | * | 12/2005 | Michiie et al. ............... | 382/305 |
| 7,119,931 B2 | * | 10/2006 | Miyamoto et al. ........... | 358/474 |
| 7,142,730 B2 | * | 11/2006 | Michiie et al. ............... | 382/305 |
| 7,173,740 B2 | * | 2/2007 | Kanamori .................... | 358/3.24 |
| 7,190,480 B2 | * | 3/2007 | Sturgeon et al. ............. | 358/1.17 |
| 7,212,307 B2 | * | 5/2007 | Kanda .......................... | 358/1.16 |
| 7,654,527 B2 | * | 2/2010 | Sheng et al. ................. | 271/270 |

FOREIGN PATENT DOCUMENTS

| | | |
|---|---|---|
| JP | 5-292268 A | 11/1993 |
| JP | 09-002958 | 7/1998 |
| JP | 10-200677 A | 7/1998 |
| JP | 11-305605 | 11/1999 |
| JP | 10-360859 | 6/2000 |
| JP | 2000-184110 A | 6/2000 |

* cited by examiner

*Primary Examiner* — James A Thompson
*Assistant Examiner* — Satwant K Singh
(74) *Attorney, Agent, or Firm* — Canon USA Inc IP Division

(57) ABSTRACT

An image processing apparatus has a capability of displaying a preview image on a display under the control of a controller even in the middle of a process of reading document pages in a binding reading mode in which a large number of document sheets are read by repeatedly performing reading on a part-by-part basis until all pages of a given set of document sheets have been read. The preview capability enables a user to easily detect if an error occurred in reading one or all of the pages. If a particular page of image data is detected to have an error, re-reading of that page is performed using a scanner unit. The page of image data having the error is discarded and the image data obtained by re-reading is inserted in place of the discarded page. After completion of re-reading, reading of the remaining pages of the document set can continue in the binding reading mode. This leads to a drastic improvement in operational efficiency.

33 Claims, 20 Drawing Sheets

FIG. 20

STORAGE MEDIUM SUCH AS AN FD OR CD-ROM

| DIRECTORY INFORMATION |
|---|
| FIRST DATA PROCESSING PROGRAM<br>   PROGRAM CODES CORRESPONDING TO<br>   STEPS IN THE FLOW CHART SHOWN IN FIG.8 |
| SECOND DATA PROCESSING PROGRAM<br>   PROGRAM CODES CORRESPONDING TO<br>   STEPS IN THE FLOW CHART SHOWN IN FIG.9 |
| THIRD DATA PROCESSING PROGRAM<br>   PROGRAM CODES CORRESPONDING TO<br>   STEPS IN THE FLOW CHART SHOWN IN FIG.10 |
|  |

MEMORY MAP OF STORAGE MEDIUM

IMAGE PROCESSING APPARATUS, IMAGE PROCESSING METHOD, AND IMAGE PROCESSING PROGRAM

BACKGROUND OF THE INVENTION

1. Field of the Invention

The present invention relates to a technique of controlling an image processing apparatus including a document reader unit capable of reading a series of document sheets on a part-by-part basis, and an image output unit for outputting image data acquired via the reading performed by the document reader unit.

2. Description of the Related Art

A digital multifunction device having a printer function, a scanner function, a facsimile function, etc., is known in the art. In such digital multifunction devices, or a similar image processing apparatus, image data obtained via the scanning function, facsimile function, or PDL data received from a host computer can be stored in a storage device of the digital multifunction device. A desired image data can later be read from the storage device and printed.

In using digital multifunction devices, when a given document set includes a series of sheets that is greater than the number of sheets than can be placed on a document tray of the digital multifunction device, it is impossible to read all of the sheets at a single time. One known technique of circumventing this problem is to read the given document set on a part-by-part basis, and then combine the separately read parts into a single set of document image data. Reading of the document set on a part-by-part basis can be accomplished either by using the digital multifunction device's automatic document feeder or by placing each sheet of the document set on the document platen of the digital multifunction device.

There are several methods for checking to ensure that reading of all the sheets of the document set was successful, i.e., that all the sheets were read correctly, that all the expected sheets are present, or that no extraneous sheets are present. In one case, a hard copy of the document set is obtained by performing a test print after reading and storing of all the sheets of the document set has been completed. The hard copy is then reviewed to ensure that the reading was successfully performed.

Another case involves image data that has been stored in the digital multifunction device's storage device after it was obtained by scanning an original document. In this case, it is possible to electronically preview the stored image data and perform editing such as deletion or insertion of a page/sheet. However, previewing of the image can only be performed after the entire document has been scanned and stored. The ability to preview the image during the actual scanning operation is not available.

It is currently known that digital copiers are capable of including a function that when an error is detected during a reading operation, a preview image of the page corresponding to the reading error can be displayed. That is, a preview image is available during the reading operation. This enables a user to confirm whether the page corresponding to the reading error is acceptable or not, which provides the user with an opportunity to decide whether to continue the copying operation without re-reading the page corresponding to the reading error. However, this particular feature of enabling previewing during the reading operation is a very limited one. Specifically, the copier is typically only stores one to two pages at any given time during the reading operation. Thus, the entire reading operation must still be completed in order for a user to be able to preview the entire document.

Specific examples of such known techniques may be found, for example, in Japanese Laid-Open Patents 5-292268, 2000-184110, or 10-200677 or Japanese Patent 3111621.

As shown above, conventional digital multifunction devices do not provide the feature of enabling a user to preview the entire image date of a document until all sheets of the document have been read. Even in the case where such a feature is provided, it is a very limited feature and is only available during a copying operation. If an error is detected after all the sheets have been read, it may be necessary to re-read a particular sheet or all the sheets. Therefore, after a plurality of document sheets are separately read as multiple batches of read image, the obtained image data is combined together and output as a series of document set, previewing is impossible until scanning of all document sets are completed. This is very inconvenient and inefficient for users.

Confirmation by reading a document sheet on the platen and printing the resultant image data is also very inconvenient for a user, particularly when a given document set includes a large number of pages. In addition, an extra number of sheets are necessary for confirmation.

SUMMARY OF THE INVENTION

In view of the above, it is an object of the present invention to provide an image processing apparatus having a capability of displaying a preview image on a display even in the middle of a process of reading document pages. The image processing apparatus includes a binding reading mode, in which a series of document sheets are divided into plural set of document sheets, each plural set is separately read, and each of the separately read plural sets are combined and stored as a series of read image. In one aspect, after each plural set is read, the read image is displayed before the next plural set is read. This allows a user to easily detect an error in read document data, wherein if a particular page of image data is detected to have an error, re-reading of that page is performed, and the page of image data having the error is replaced with the image data obtained by re-reading. After completion of the re-reading, reading of the remaining pages of the document set can continue in the binding reading mode.

In an aspect, the present invention provides an image processing apparatus comprising image reading means for reading plural pages of a document, image storage means for storing image data produced by the image reading means, display means for displaying image data stored in the image storage means, and control means for controlling the reading operation for the plural pages of the document and displaying of image data on the display means such that the stored image data is displayed at an interval during the reading operation before completing the reading operation for the plural pages of the document.

The image processing apparatus further comprising means for executing a binding reading mode, wherein a series of document sheets are divided into a plural set of document sheets, each divided set of document sheets is separately read, and the plural set of image read by the plural reading operations are combined and stored as a series of read image, wherein the display interval is an interval between a first reading process for one divided set of document sheets and a second reading process for another divided set of document sheets.

The image processing apparatus according to the present invention may further comprise command acceptance means for accepting a read-end command in the binding reading mode, wherein, in the binding reading mode, the control means is adapted to be capable of displaying image data stored in the image storage means on the display means before the command acceptance means accepts the read-end command.

In the image processing apparatus according to the present invention, in the binding reading mode, the control means is capable of displaying image data stored in the image storage means on the display means before the second input process is started.

In the image processing apparatus according to the present invention, in the binding reading mode, the control means is capable of displaying image data stored in the image storage means on the display means after completion of the first input process and before the second input process is started.

The image processing apparatus according to the present invention may further comprise re-read means for re-reading a document page using the image reading means and replacing image data corresponding to image data currently displayed on the display means with image data obtained by the re-reading.

In the image processing apparatus according to the present invention, in response to completion of the first input process, inputting of a command to display image data stored in the image storage means on the display means may be enabled.

In the image processing apparatus according to the present invention, in response to completion of the first input process, inputting of a read-end command in the binding reading mode may be enabled.

Further objects, features and advantages of the present invention will become apparent from the following description of the preferred embodiments with reference to the attached drawings.

BRIEF DESCRIPTION OF THE DRAWINGS

FIG. 20 is a diagram showing a memory map of a storage medium in which various data processing programs are stored in a manner readable by the image processing apparatus according to the present invention.

DESCRIPTION OF THE PREFERRED EMBODIMENTS

The present invention is described in further detail below with reference to preferred embodiments in conjunction with the accompanying drawings.

Figure 1:
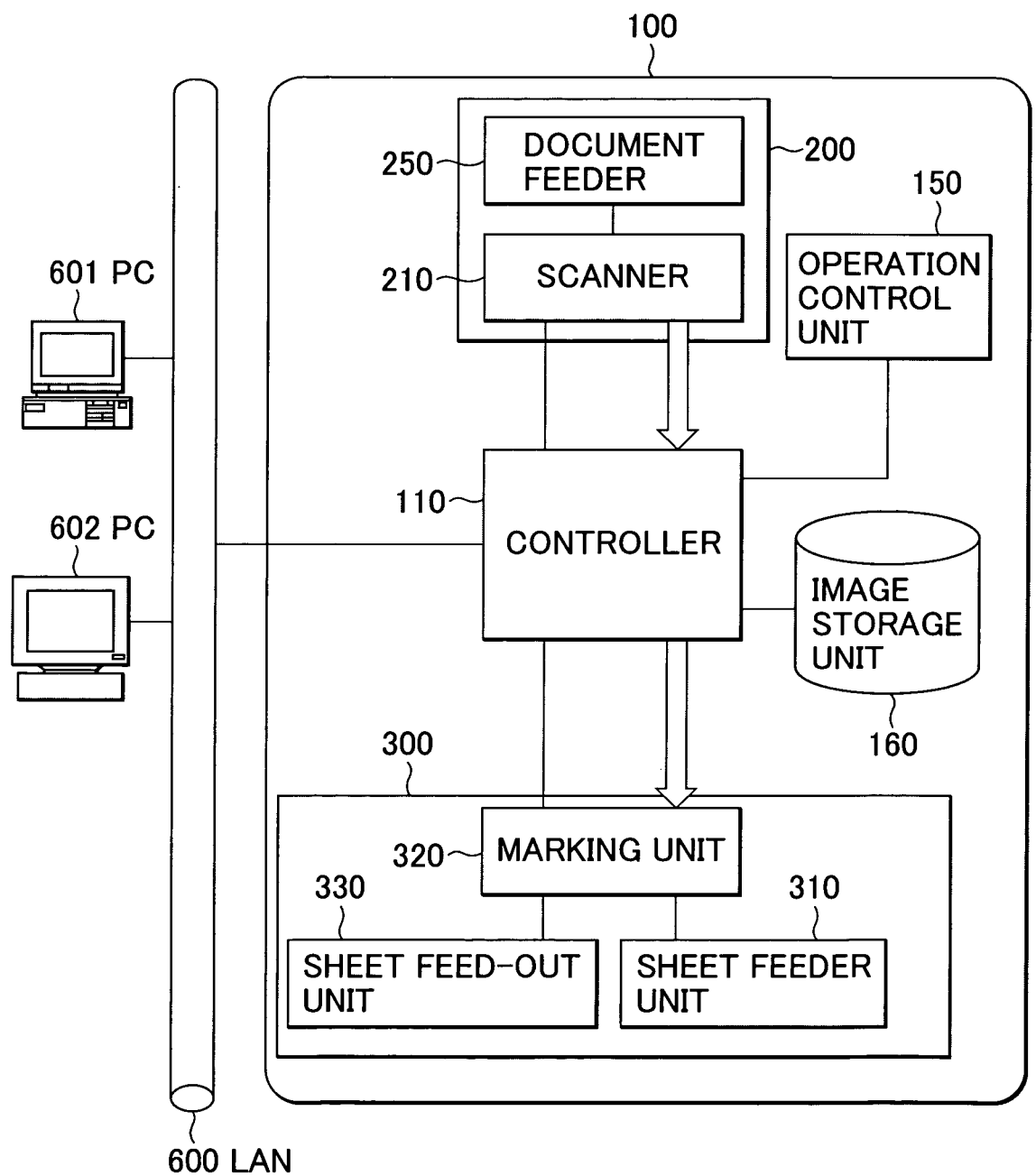
FIG. 1 is a block diagram showing an image processing system including an image processing apparatus according to an embodiment of the present invention.

FIG. 1 is a block diagram showing an image processing system including an image processing apparatus according to an embodiment of the present invention. In this specific example shown in FIG. 1, the image processing apparatus according to the present invention is an image input/output system 100 connected to a first host computer 601 and a second host computer 602 via a LAN (Local Area Network) 600 such as a Ethernet® LAN. The present invention is not limited to this means of connecting host computers 601 and 602 with image input/output system 100 and any means of connecting host computers 601 and 602 with input/output system 100 that would enable practice of the present invention is applicable.

The image input/output system 100 includes a reader unit 200 for reading image data, a printer unit 300 for outputting image data, an operation control unit 150 including a keyboard for inputting a command to control the operation of inputting or outputting image data, a liquid crystal panel (not shown) for displaying image data and associated information and for use in setting of operation condition, an image data storage unit 160 for storing image data read via the reader unit 200 or image data produced from code data received from the host computer 601 or 602 via the LAN 600, and a controller 110 formed of a single electronic component for controlling the above elements connected to the controller 110.

The reader unit 200 includes a document feeder (DF) 250 for feeding a document sheet, and a scanner unit 210 for optically reading a document image and producing corresponding image data in the form of an electrical signal. The printer unit 300 includes a sheet feeder unit 310 with a plurality of paper cassettes in which stacks of printing paper are placed, a marking unit 320 for transferring image data to printing paper and fixing the transferred image, and a sheet feed-out unit 330 for sorting printed sheets, stapling sets of printed sheets, and outputting them to the outside.

The controller 110 reads document data by controlling the reader unit 200 and prints the document data on printing paper by controlling the printer unit 300, thereby providing the copying function.

A scanner function is provided by reading image data using the reader unit 200, converting code data, and transmitting the resultant code data to the host computer 601 or 602 via the network 600. A printer function is provided by converting code data received from the host computer 601 or 602 via the network 600 into image data and outputting the resultant image data to the printer unit 300.

Figure 2:
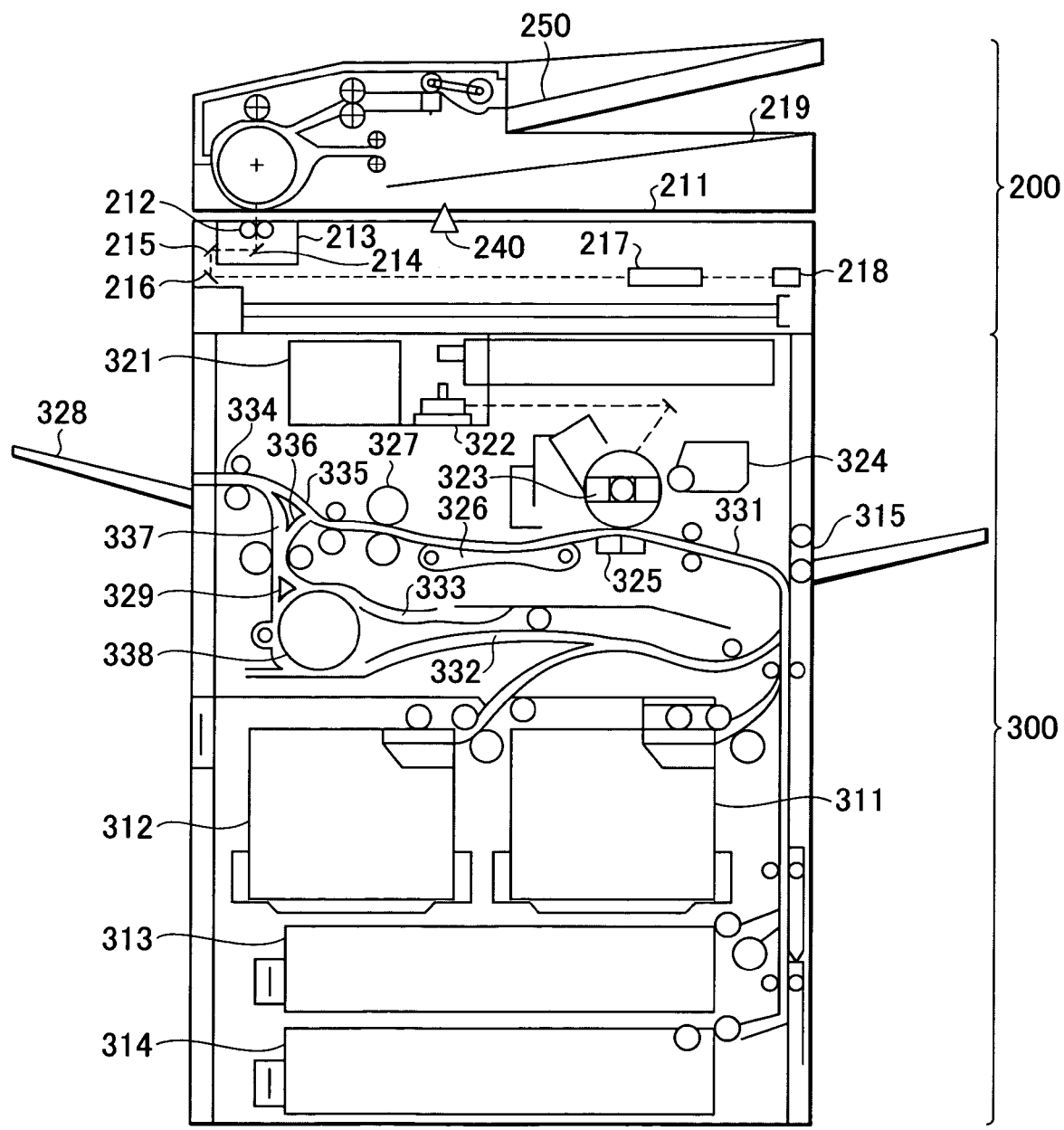
FIG. 2 is a cross-sectional view showing the details of a reader unit and a printer unit shown in FIG. 1.

FIG. 2 is a cross-sectional view depicting the details of the reader unit 200 and the printer unit 300 shown in FIG. 1. Elements in FIG. 2 that are the same as those in FIG. 1 are denoted by similar reference numerals.

In the reader unit 200 shown in FIG. 2, document sheets stacked on the document feeder 250 are sequentially fed one by one from the top to the bottom of the stack onto platen glass 211, and image data thereof is read by the scanner unit 210. After completion of reading, the document sheet is transported from the platen glass 211 to an output sheet tray 219.

When a document sheet is fed onto the platen glass 211, a lamp 212 is turned on, and the optical unit 213 is moved. Thus, the document sheet is illuminated from below while being scanned, and reflected-light from the document sheet is directed to a CCD image sensor (hereinafter, referred to simply as a CCD) 218 via mirrors 214, 215, 216 and a lens 217. Thus, the CCD 218 reads the document image. The image data read by the CCD 218 is subjected to predetermined processing and the resultant image data is sent to a controller 110.

In the case, in which the document feeder 250 has the flow-scanning capability, a document sheet fed from the stack on the document feeder 250 is passed through the flow-scanning position 240 at a constant speed. In this case, the optical unit 213 is moved to the flow-scanning position 240 so that the document sheet being moved at the constant speed is illuminated by light emitted from the lamp 212, and reflected light is detected by the CCD 218, thereby producing image data. The resultant image data is sent to the controller 110.

In the printer unit 300, a laser driver 321 drives a laser 322 in accordance with image data output from the controller 110. As a result, a laser beam with intensity corresponding to the image data is emitted from the laser 322. When the laser beam contacts a photosensitive drum 323, an electrostatic latent image is formed thereon. Developing unit 324 develops the latent image by applying a developer to the latent image.

In synchronization with laser 322 emitting the laser beam, printing paper is fed from one of a cassette 311, a cassette 312, cassette 313, a cassette 314, or a manual sheet feed tray 315 to an image transfer unit 325 via a transport path 331, and the developer on the photosensitive drum 323 is transferred to the printing paper. After the image has been transferred to the printing paper, transport belt 326 transports the printing paper to a fixing unit 327. The fixing unit 327 fixes the image formed on the printing paper by means of heating and pressing.

After passing through the fixing unit 327, the printing paper is output onto an output sheet bin 328 via a transport path 335 and a transport path 334. In a case in which the printing paper is output to the output sheet bin 328 after the printing paper is turned over, the printing paper is transported to a transport path 336 and further to a transport path 338, and the printing paper is transported in a reverse direction to the output sheet bin 328 via a transport path 337 and a transport path 334. Although not shown in the figure, instead of the output sheet bin 328, an output sheet unit may be attached. The output sheet unit is capable of sorting printed sheets into plural sets of sheets and stapling each set of sheets.

In a case in which printing is performed on both sides of paper, the printing paper is transported from the fixing unit 327 to the transport path 336. Thereafter, a flapper 329 directs the printing paper is to a transport path 333. The printing paper is then transported in the reverse direction to the flapper 329. The flapper 329 directs the printing paper to the transport path 338. Thus, the printing paper is transported to a re-feeding transport path 332. Thereafter, the printing paper is fed to the image transfer unit 325 via the transport path 331.

Figure 3:
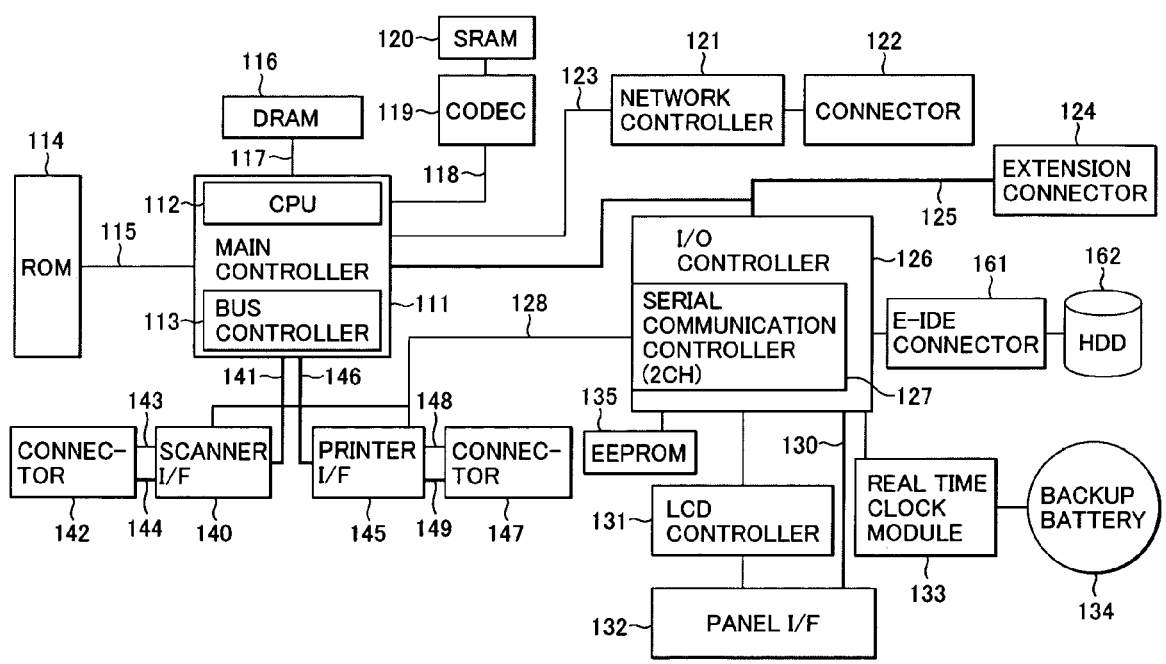
FIG. 3 is a block diagram showing the details of a controller of the reader unit shown in FIG. 1.

FIG. 3 is a block diagram showing the details of the controller 110 of the reader unit 200 shown in FIG. 1.

As shown in FIG. 3, a main controller 111 includes a CPU 112, a bus controller 113, and other functional blocks including various controllers that will be described later. The main controller 111 is connected to a ROM 114 via a ROM I/F 115, to a DRAM 116 via a DRAM I/F 117, and to a codec 119 via a codec I/F 118. The main controller 111 is also connected to a network controller 121 via a network I/F 123, wherein the network controller 121 is connected to the LAN 600 via a connector 122.

In the ROM 114, various programs executed by the CPU 112 in the main controller 111 and data necessary in executing the programs are stored. The DRAM 116 provides a work area for use by the CPU 112. The DRAM 116 is also used to store image data. The codec 119 compresses raster image data stored in the DRAM 116 by a known compression method such as MH, MR, MMR, or JBIG. The codec 119 also decompresses compressed image data into raster image data. The codec 119 is connected to a SRAM 120, which is used by the codec 119 as a work area.

The main controller 111 is also connected to a scanner I/F 140 via a scanner bus 141, to a printer I/F 145 via a printer bus 146, and to an input/output controller 126 and an extension connector 124 (for connection with an extension board) via a multipurpose high-speed bus 125 such as a PCI bus.

The input/output controller 126 includes a 2-channel serial asynchronous communication controller 127 for transmitting and receiving a control command to or from the reader unit 200 or the printer unit 300. The serial communication controller 127 is connected to the scanner I/F 140 and the printer I/F 145 via the I/O bus 128.

The scanner I/F 140 is connected to a scanner connector 142 via a first asynchronous serial I/F 143 and a first video I/F 144. The scanner connector 142 is connected to the scanner unit 210 of the reader unit 200.

The scanner I/F 140 performs processing on image data received from the scanner unit 210, such as conversion into 2-level image data, and/or scaling up/down in the main scanning direction and/or in the sub scanning direction, and the scanner I/F 140 produces a control signal on the basis of the video signal received from the scanner unit 210. The resultant image data is transferred to the main controller 111 via the scanner bus 141.

The printer I/F 145 is connected to a printer connector 147 via a second asynchronous serial I/F 148 and a second video I/F 149. The printer connector 147 is connected to the marking unit 320 of the printer unit 300. The printer I/F 145 performs a smoothing process on image data received from the main controller 111 and supplies the resultant image data to the marking unit 320. The printer I/F 145 also produces a control signal on the basis of a video signal received from the marking unit 320 and transmits the produced control signal over the printer bus 146.

The CPU 112 operates in accordance with a control program read from the ROM 114 via the ROM I/F 115. For example, the CPU 112 interprets PDL (Page Description Language) data received from the first host computer 601 or the second host computer 602 and converts the received PDL data into raster image data.

The bus controller 113 controls transmission/reception of data to/from external devices connected to the scanner I/F 140, the printer I/F 145, or the extension connector 124. More specifically, the bus controller 113 performs arbitration on usage of the bus and controls the DMA data transfer. For example, the data transfer between the DRAM 116 and the codec 119, the data transfer from the scanner unit 210 to the DRAM 116, and the data transfer from the DRAM 116 to the marking unit 320 are performed in the DMA scheme under the control of the bus controller 113.

The I/O controller 126 is connected to a panel I/F 132 via a LCD controller 131 and a key input I/F 130. The panel I/F 132 is connected to the operation control unit 150. The I/O controller 126 is also connected to an EEPROM 135 serving as a nonvolatile memory, to a hard disk drive (HDD) 162 for writing/reading image data via an E-IDE connector 161, and to a real time clock module 133 for providing data indicating the date/time used in the image processing apparatus. Backup battery 134 provides back-up power to real time clock module 133.

Figure 4:
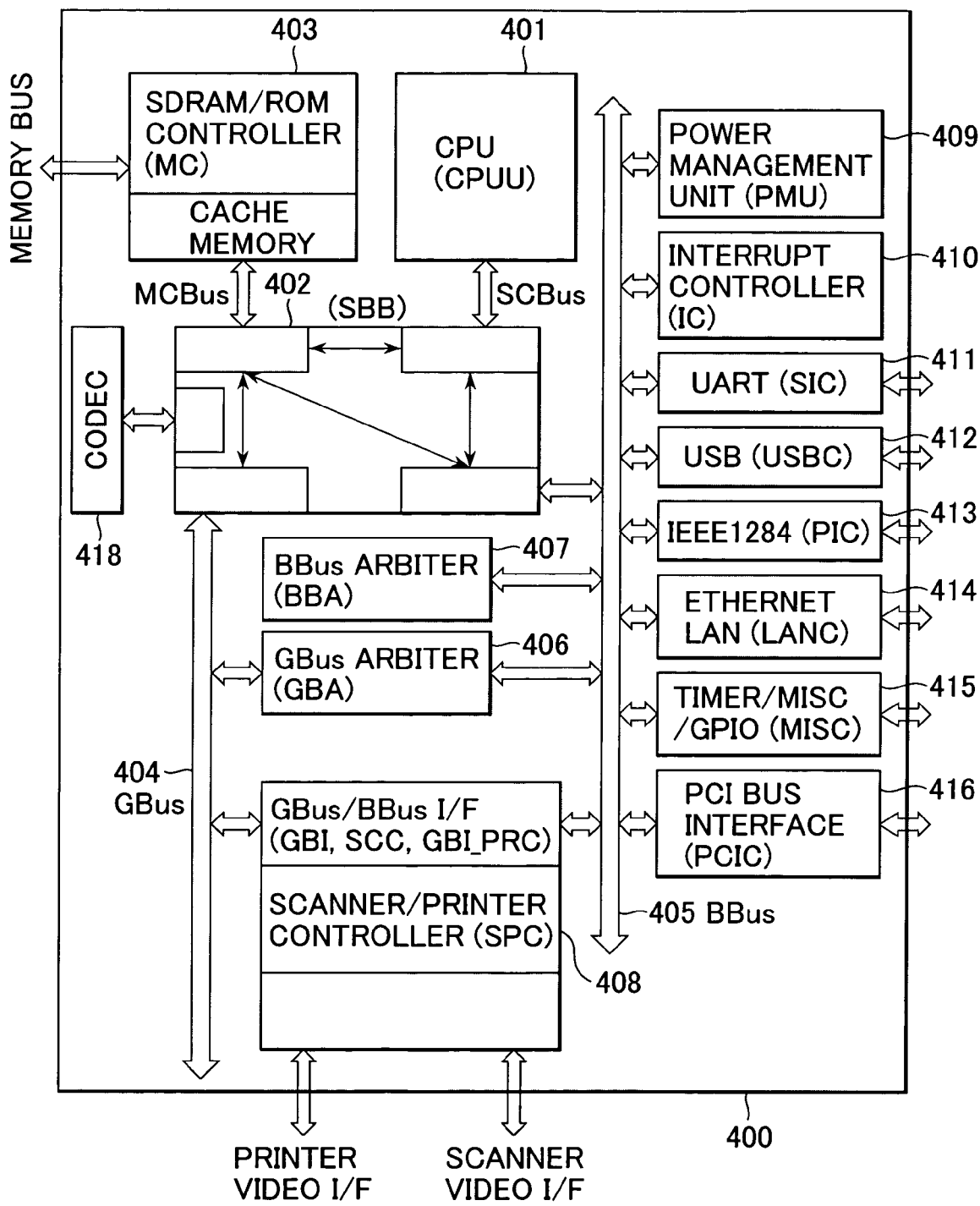
FIG. 4 is a block diagram showing the details of the internal structure of a main controller shown in FIG. 3.

FIG. 4 is a block diagram showing the details of the internal structure of the main controller 111 shown in FIG. 3.

As shown in FIG. 4, a processor core (CPU) 401 is connected to a system bus bridge (SBB) 402 via a 64-bit processor bus (SCBus). The SBB 402 is a 4×4 64-bit crossbar switch connected to a total of four buses, i.e., the SCBus for connection with the processor core 401, a local bus (MCBus) dedicated to connection with a memory controller 403 with a cache memory for controlling an SDRAM or a ROM, a graphic bus (GBus) 404, and a IO bus (BBus) 405.

The SBB 402 is designed so that the above-described four modules are connected as concurrently as possible. The SBB 402 is also connected to a codec (data coder/decoder) 418 via a codec I/F.

The GBus 404 is connected to a scanner/printer controller (SPC) 408 for connection with the scanner or the printer, wherein the GBus 404 is controlled by a GBus arbiter (GBA) 406 so that the GBus 404 provides cooperative connection. The BBus 405 is connected to the SPC 408, a power management unit (PMU) 409, an interrupt controller (IC) 410, a serial interface controller (SIC) 411 using a UART, a USB controller 412, an IEEE1284 parallel interface controller (PIC) 413, a Ethernet® LAN controller (LANC) 414, a multipurpose input/output controller (MISC) 415, and a PCI bus interface (PCIC) 416, wherein the BBus 405 is controlled by a BBus arbiter (BBA) 407 such that the BBus 405 can provide cooperative connection with the above devices.

The BBus arbiter 407 is an arbiter for controlling the BBus 405 such that the BBus 405 can provide cooperative connection. If the BBus arbiter 407 receives a request for use of the BBus 405, the BBus arbiter 407 performs arbitration such that only one selected master is enabled to use the BBus 405. This prevents the BBus 405 from being used by two or more masters at the same time. For the purpose of arbitration, three priority levels are defined and each master is assigned one of those three priority levels.

The interrupt controller 410 deals with external interrupts from the above described various functional blocks and the controller 110. Any external interrupt is first received by the interrupt controller 410 and then redistributed as a non-maskable interrupt to controllers 408 and 411 to 416 supported by the CPU 401.

The power management unit 409 monitors the power consumption of the 1-chip controller 110 and controls the power consumption of each functional block. The controller 110 is made of a large-scale ASIC (Application Specific Integrated Circuit), including the CPU 401. If all functional blocks in the controller 110 operate at the same time, a large amount of heat is generated, which may destroy the controller 110.

To prevent the controller 110 from being destroyed by such overheating, the power management unit 409 acquires data indicating the power consumption (power management level) of each functional block, calculates the total power consumption, and controls the power consumption of each functional block so that the total power consumption is maintained lower than a maximum allowable value.

The GBus arbiter 406 controls the GBus 404 by means of centralized arbitration so that the GBus 404 can be used cooperatively by bus masters. The GBus arbiter 406 performs arbitration using request signals and enables signals that are uniquely defined for the respective bus masters. Priority is assigned to the respective bus masters selective in either an equal arbitration mode in which priority is equally assigned to all bus masters or in a priority arbitration mode in which, of various bus masters, a particular bus master is assigned high priority.

Figure 5:
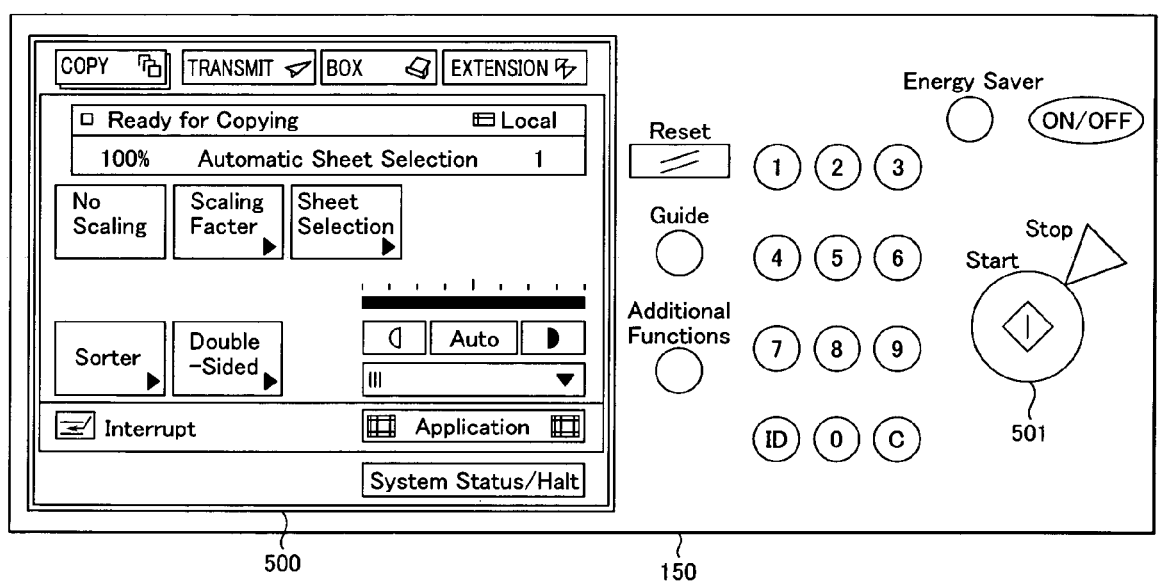
FIG. 5 is a plan view showing an example of a display screen of an operation control unit shown in FIG. 1.
Figure 6:
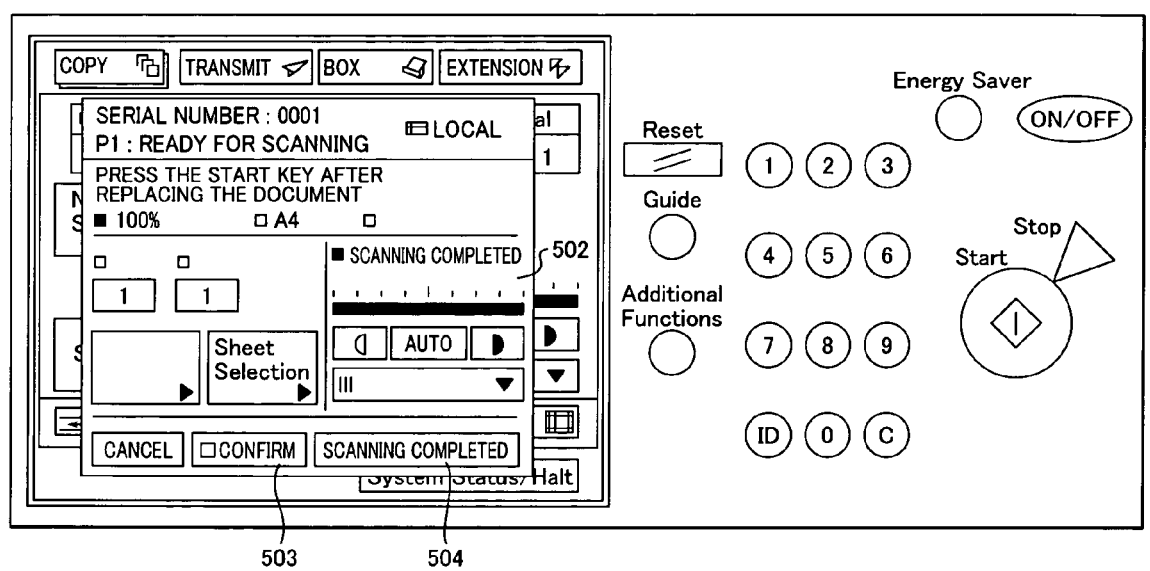
FIG. 6 is a plan view showing an example of a display screen of an operation control unit shown in FIG. 1.
Figure 7:
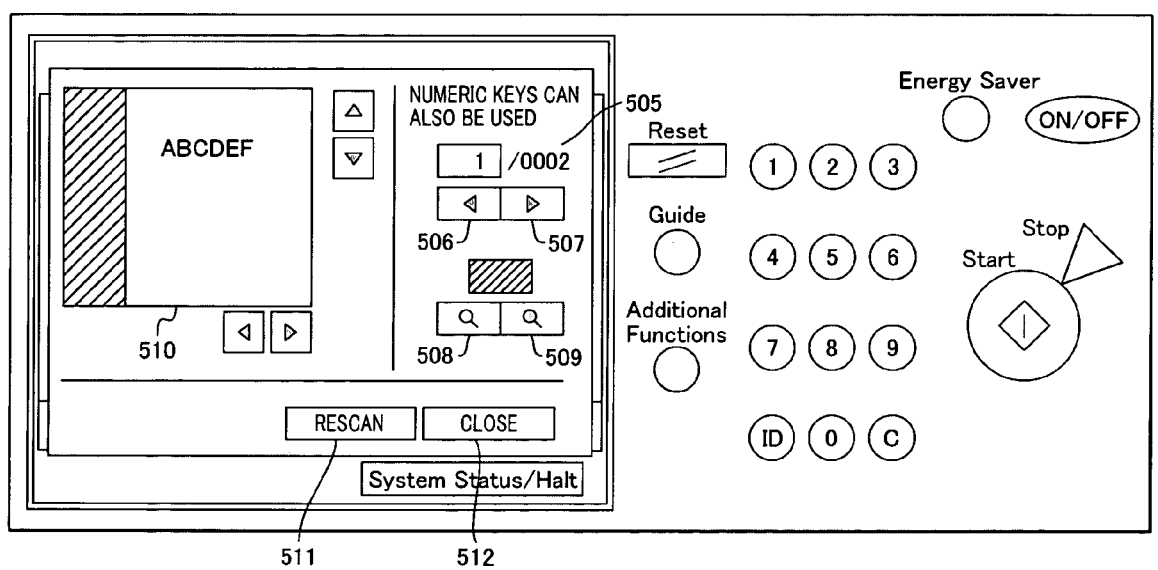
FIG. 7 a plan view showing an example of a display screen of an operation control unit shown in FIG. 1.

FIGS. 5 to 7 are plan views of the operation control unit 150 shown in FIG. 1, wherein some examples of the states of the display screen on the operation control unit 150 are shown.

In FIG. 5, reference numeral 500 denotes a user interface in the form of a liquid crystal touch panel. Via this user interface, a user can implement settings associated with various copying modes (e.g., double-sided printing, grouping, sorting, stapling, etc.).

The mode setting means may be realized by either soft keys displayed on the touch panel or hard keys. Reference numeral 501 denotes a start button. If start button 501 is pressed, a copying process is initiated.

FIG. 6 shows an example of a setting screen 502 for use in setting of reading conditions displayed on the user interface 500. This setting screen 502 appears if the binding reading mode is selected after the copying process is started by selecting the start button 501. If the binding reading mode is selected, all document pages are read first before they are printed.

As shown in FIG. 6, the setting screen 502 for use in setting reading conditions includes a "confirm" button 503 and a "scanning completed" button 504. If the "confirm" button 503 is selected, the operation mode is switched into a preview mode in which images of read document data are displayed. If the "scanning completed" button 504 is selected, all read image data is output.

FIG. 7 shows a preview image display screen that appears in response to selecting the "confirm" button 503 on the setting screen 502.

In FIG. 7, the total number of pages of stored document image data and the page number of the page being currently displayed are displayed in a page information display area 505. If an arrow button 506 is pressed, the image being currently displayed is switched to a previous page. On the other hand, if an arrow button 507 is pressed, the image being displayed is switched to a next page.

If a zoom out button 508 is pressed, the preview image is zoomed out. On the other hand, if a zoom in button 509 is button is pressed, the preview image is zoomed in.

The preview image of a document page specified in the page information display area 505 is displayed in a preview image display area 510. If a "re-scan" (re-read) button 511 is pressed, data indicating the page corresponding to the preview image being currently display is stored, and the preview image display screen 510 is closed. If the preview image display screen 510 is closed, the setting screen 502 for setting of reading conditions again appears, and it becomes possible to read a document.

If reading is performed in this state, reading is performed in the re-read mode. In FIG. 7, a "close" button 512 is used to close the preview image display screen 510. If the preview image display screen 510 is closed in response to selecting the "close" button 512, the setting screen 502 for setting of reading conditions again appears, and it becomes possible to read a document. In this case, reading is performed in the binding reading mode.

As described above, in the binding reading mode, if one or more new document pages are read, the obtained image data is stored at a location after the end of the existing image data. After all document pages have been read, all image data is dealt with as a single set of image data. That is, in the binding reading mode, all image data obtained via a plurality of separate reading operations is combined together into a single set of image data and output to the printer unit 300. On the other hand, in the re-read mode, a particular page of stored image data is replaced with newly read image data. In any mode, reading is started in response to selecting the start button 501.

Figure 8:
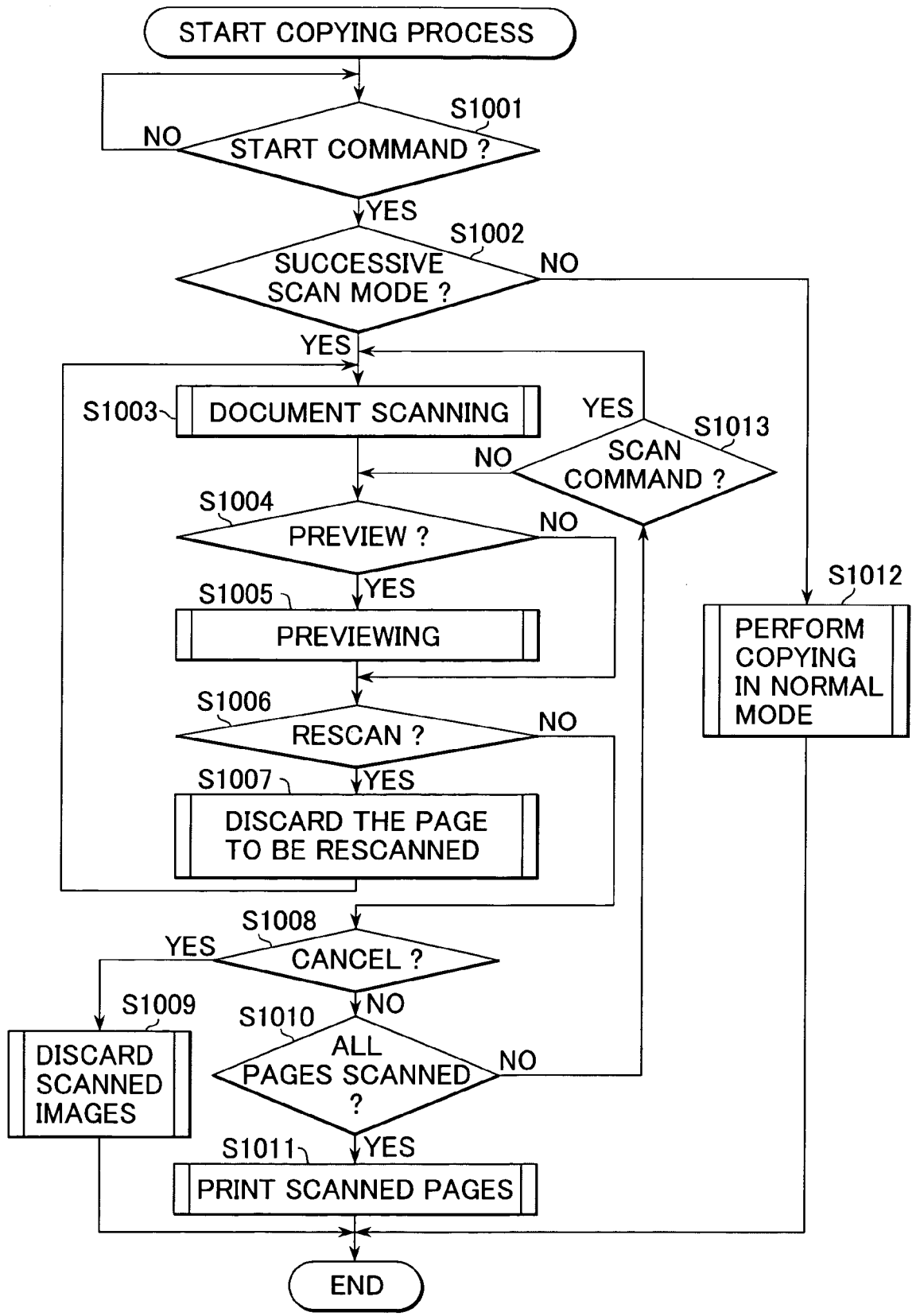
FIG. 8 is a flow chart showing a first image data processing procedure performed by the image processing apparatus according to the present invention.

FIG. 8 is a flow chart showing a first image data processing process (in the binding reading mode) performed by the image processing apparatus according to the present invention. As previously described, in the binding reading mode, a series of document sheets are divided into a plural set of document sheets, each divided set of document sheets is separately read, and the plural set of image read by the plural reading operations are combined and stored as a series of read image. Note that the CPU 112 performs the steps of this process by executing a control program that is loaded into the DRAM 116 from the ROM 114 or the like.

First, in step S1001, it is determined whether a start command has been issued (i.e., selecting the start button 501). In the case in which it is determined that a start command has not been issued, step S1001 is repeated until a start command is issued.

If it is determined in step S1001 that a start command has been issued (i.e., button 501 has been selected), the process proceeds to step S1002. In step S1002, it is determined whether the binding reading mode is selected. If the binding reading mode is not selected, the process proceeds to step S1012. In step S1012, copying is performed in the normal mode. After completion of copying in step S1012, the process ends.

On the other hand, in the case in which it is determined in step S1002 that the binding reading mode is selected, the process proceeds to step S1003. In step S1003, reading of image data for document sheets sequentially fed from the automatic document feeder (DF) or for a document sheet put on the platen is performed. If reading is completed for all document sheets, issuing a command via the operation control unit 150 is enabled. Next, in step S1004, it is determined whether a command to display preview images of the document image data stored in the image storage unit 160 has been issued. If it is determined that the command to display preview images has been issued, the process proceeds to step S1005. In step S1005, preview images are displayed. After completion of step S1005, the process proceeds to step S1006. In the above process, the displaying of preview images is allowed after completion of reading one divided set of document sheets and before completing the reading operation for all of the document sheets. In other words, the reading operation is preferably temporarily suspended between a first reading process for one divided set of document sheets and a second reading process for another divided set of document sheets when the preview images are displayed. If preview images are displayed in real time while the reader unit 200 is reading document images, the system has to execute both image processing for reading image and processing associated with previewing image in parallel and the load to the system increases, thereby decreasing the system's operational performance. Also, the preview image being displayed is changes as the images are being read, thus making it difficult for a user to determine from the preview images whether document images have been correctly read and to determines whether to issue a re-read command. In the case in which the command to display preview images is not issued in step S1004, the process proceeds to step S1006. Any interval other than the preferred interval described above that would enable practice of the present invention is applicable.

In step S1006, it is determined whether a re-read command has been issued. Note that the issuing of the re-read command is included in the preview image display step (step S1005), and if the re-read command is issued, data indicating the storage location of a page to be re-read is stored. In the case in which the re-read command has been issued, the process proceeds to step S1007. However, if the re-read command is not issued, the process proceeds to step S1008.

In step S1007, the image data of the page specified to be re-read is discarded (i.e., deleted). Thereafter, the process returns to step S1003 to re-read the specified document page, and the old image data of that page is replaced with the image data obtained via the re-reading. Thus, the user can easily replace the image data simply by issuing the re-read command without having to issue a delete command in addition to the re-read command. In the above process, if the re-read command is issued, only one page of document on the automatic document feeder is read and the image data corresponding to the current preview image is replaced with the image data obtained by the re-reading. This makes it possible for the user to easily understand what page is to be deleted and what is to be inserted in place of the deleted page. Although in the present example, only one page of image data is deleted and replaced with image data obtained by the re-reading, plural pages of image data may be replaced with corresponding pages of image data obtained by re-reading.

In step S1003 described above, the reading of document image data can be performed not only for all document sheets sequentially fed from the automatic document feeder or placed on the platen, but also for a specified number of document sheets sequentially fed from the automatic document feeder. In the re-reading, the number of document sheets to be read is specified as one.

In step S1008, it is determined whether a command to cancel the reading of the document image data in the binding reading mode has been issued. If it is determined that the cancel command has been issued, the process proceeds to step S1009. In step S1009, all image data stored via the previous steps is deleted, and the copying process ends.

On the other hand, in the case in which it is determined in step S1008 that the cancel command is not issued, the process proceeds to step S1010. In step S1010, it is determined whether a read-end command has been issued.

If it is determined in step S1010 that the read-end command has been issued, the process proceeds to step S1011. In step S1011, all image data obtained via the previous steps is printed. After completion of printing, the copying process ends.

In the case in which it is determined in step S1010 that the read-end command is not issued, the process proceeds to step S1013. In step S1013, it is determined whether the read command has been issued. If it is determined in step S1013 that the read command has been issued, the process returns to step S1003 to perform the document reading process.

On the other hand, if it is determined in step S1013 that the read command is not issued (i.e., selecting the start button 501), the process returns to step S1004. That is, in the case in which no command is issued via the operation control unit 150, the process waits in step S1004 until one of commands including the preview image display command, the re-read command, the cancel command, the read-end command, and the read command is issued.

Figure 9:
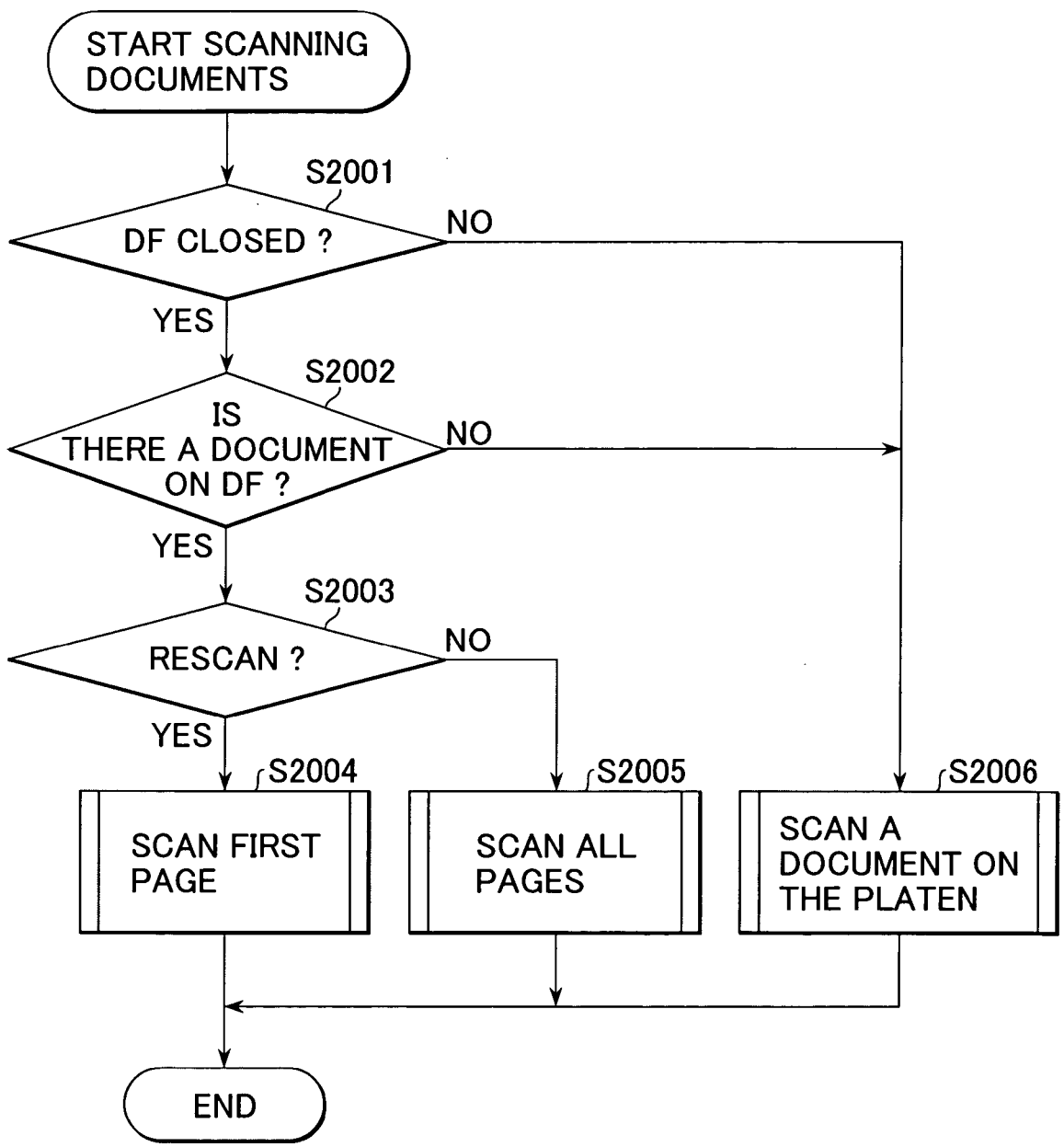
FIG. 9 is a flow chart showing a second image data processing procedure performed by the image processing apparatus according to the present invention.

FIG. 9 is a flow chart showing a second image data processing process (document reading process) performed by the image processing apparatus according to the present invention. Note that the CPU 112 performs the steps in this process by executing a control program that is loaded into the DRAM 116 from the ROM 114 or the lik.

First, in step S2001, the status of the automatic document feeder (DF) is detected. More specifically, it is determined whether the automatic document feeder is in a closed state or an open state. If it is determined that the automatic document feeder is in the open state, the process proceeds to step S2006. In step S2006, reading of document image data is performed for document sheets sequentially put on the platen. After completion of reading, the process ends.

On the other hand in the case in which it is determined in step S2001 that the automatic document feeder is in the closed state, the process proceeds to step S2002. In step S2002, it is determined whether a set of document sheets is placed on the automatic document feeder. If it is determined that no document is placed on the automatic document feeder, the process proceeds to step S2006. In step S2006, reading of document image data is performed for a document sheet put on the platen. After completion of reading, the process ends.

On the other hand, if it is determined in step S2002 that a set of document sheets is placed on the automatic document feeder, the process proceeds to step S2003. In step S2003, it is determined whether a re-read command has been issued. If it is determined in step S2003 that the re-read command has been issued, the process proceeds to step S2004. In step S2004, one page of the document set is fed from the automatic document feeder and read. After completion of reading the one page, the process ends. In the above process, if the re-read command is issued, only one page of document on the automatic document feeder is read and the image data corresponding to the current preview image is replaced with the image data obtained by the re-reading. This makes it possible for the user to easily understand what page is to be deleted and what is to be inserted in place of the deleted page. Although in the present example, only one page is re-read, re-reading may be performed for a specified number of pages.

In the case in which it is determined in step S2003 that the re-read command is not issued, the process proceeds to step S2005. In step S2005, reading is performed for all pages of the document fed from the automatic document feeder. After completion of reading, the process ends.

Figure 10:
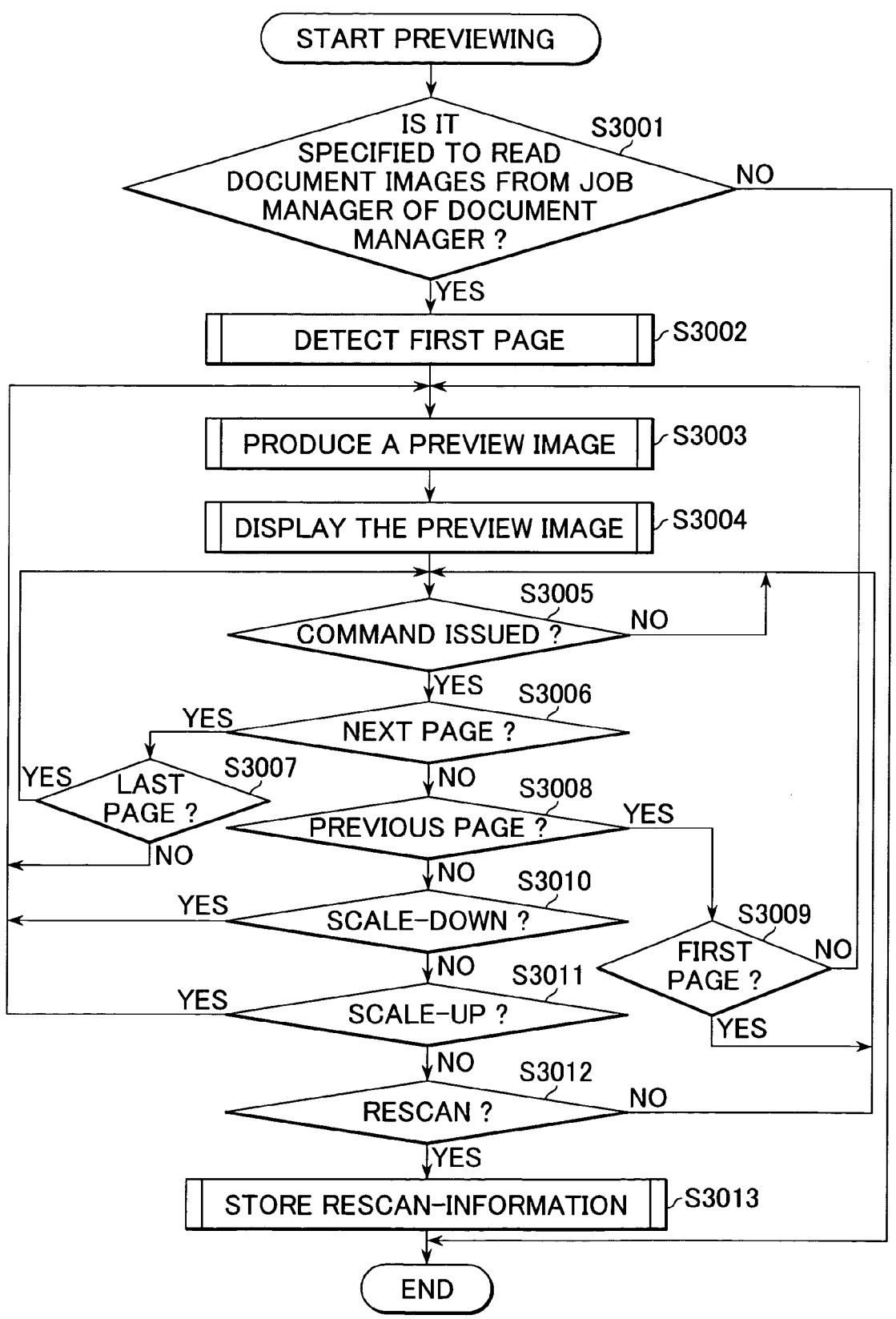
FIG. 10 is a flow chart showing a third image data processing procedure performed by the image processing apparatus according to the present invention.

FIG. 10 is a flow chart showing a third image data processing process (of displaying preview images) performed by the image processing apparatus according to the present invention. Note that the CPU 112 performs the steps in this process by executing a control program that is loaded into the DRAM 116 from the ROM 114 or the like.

First, in step S3001, it is determined whether image data, which is stored at a particular storage location in the image storage unit, is specified to be previewed.

Figure 13:
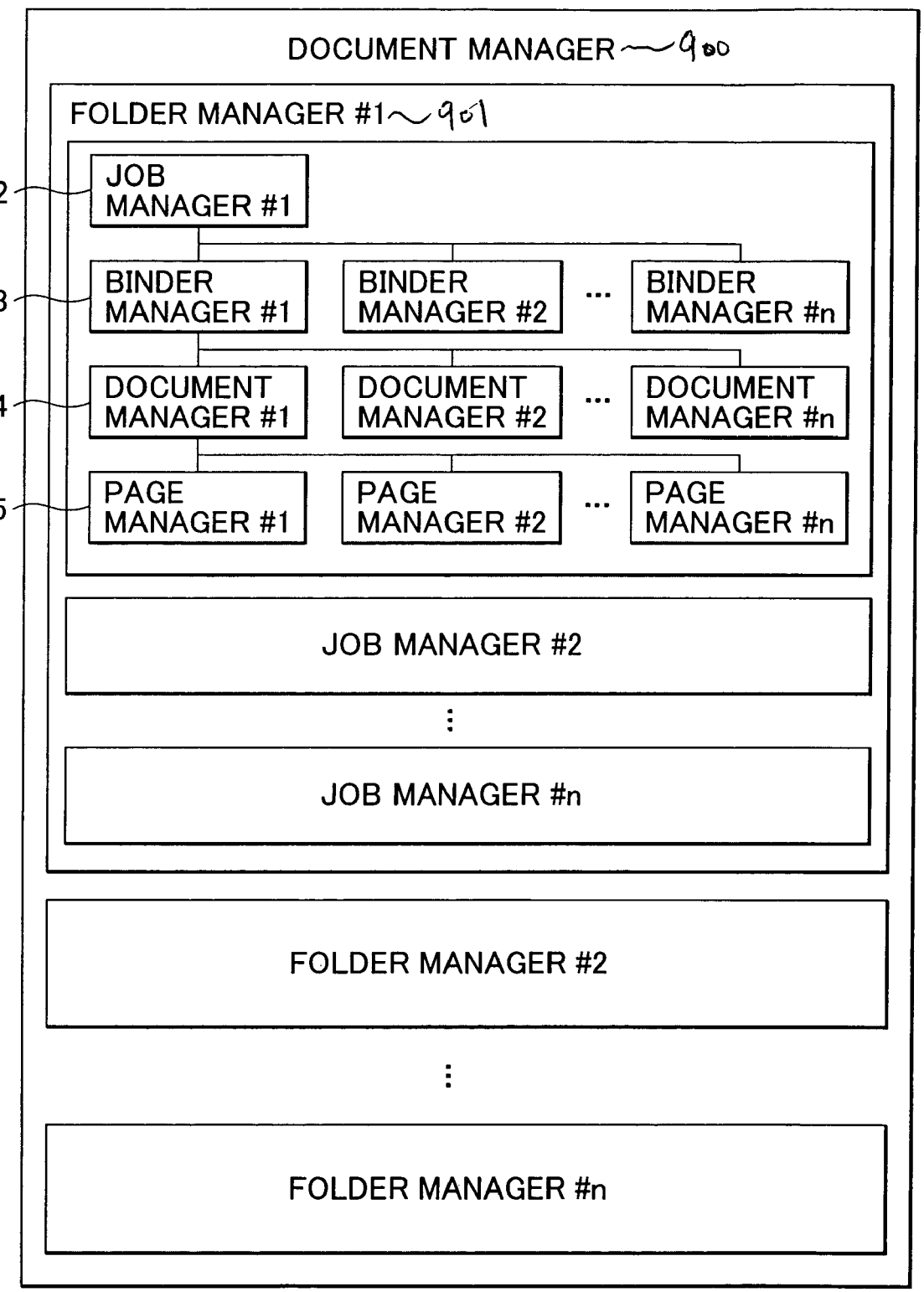
FIG. 13 is a diagram showing the configuration of a document manager for managing image data stored in a storage unit shown in FIG. 1.

The image data read in the binding reading mode is stored in the job manager 902 of the document manager 900 shown in FIG. 13. Therefore, by specifying the job manager 902, it is possible to read the image data stored therein from the first to last pages.

If it is determined in step S3001 that no image data is specified to be previewed, the process ends without displaying any preview image.

If it is determined in step S3001 that a preview command has been issued, the process proceeds to step S3002. In step S3002, the first page of the stored image data is identified. In the next step S3003, preview image data to be displayed in the preview image display screen 510 is produced from the stored image data.

Although in the present embodiment, the preview image data is produced immediately before it is displayed in the preview image display screen 510, the preview image data may be produced when document image data is acquired, and the produced preview image data may be stored together with the original image data in the external storage unit 160.

In step S3004, the preview image data produced in step S3003 is displayed in the preview image display screen 510.

Then the process waits in step S3005 until a command is issued. If any command is detected, the process proceeds to step S3006. In step S3006, it is determined whether the issued command is a display-next-page command. If it is determined that the issued command is the display-next-page command, the process proceeds to step S3007.

In step S3007, it is determined whether the current page is the last page of the stored image data. If it is determined that the current page is the last page, the process returns to step S3005, and waits until another command is issued.

In the case in which it is determined in step S3007 that the current page is not the last page, the process returns to step S3003. In step S3003, as described above, preview image data of a specified page is produced.

In the case in which it is determined in step S3006 that the issued command is not the display-next-page command, the process proceeds to step S3008. In step S3008, it is determined whether the issued command is a display-previous-page command. If it is determined that the issued command is the display-previous-page command, the process proceeds to step S3009. In step S3009, it is determined whether the current page is the first page of the stored image data. If it is determined that the current page is the first page, the process returns to step S3005. The process waits in step S3005 until any command is issued.

In the case in which it is determined in step S3009 that the current page is not the first page, the process returns to step S3003, in which preview image data of a specified page is produced.

In the case in which it is determined in step S3008 that the issued command is not the display-previous-page command, the process proceeds to step S3010. In step S3010, it is determined whether the issued command is a command to zoom out the image displayed in the preview image display screen 510. If so, the process returns to step S3003. In step S3003, scaled-down image data of the specified page is produced.

In the case in which it is determined in step S3010 that the issued command is not the zoom-out command, the process proceeds to step S3011. In step S3011, it is determined whether the issued command is a zoom-in command. If it is determined that the issued command is the zoom-in command, the process returns to step S3003. In step S3003, scaled-up image data of the specified page is produced.

In the case in which it is determined in step S3011 that the issued command is not the zoom-in command, the process proceeds to step S3012. In step S3012, it is determined whether the issued command is a re-read command. If it is determined that the issued command is the re-read command, the process proceeds to step S3013. In step S3013, it is determined which location in the document manager 900 the image data corresponding to the current preview image is stored at, and identification information indicating the location is stored. Thereafter, the process ends. The identification information stored in step S3013 is transferred to the image reading process described above, and re-reading is performed in accordance with the identification information. Thus, the user can replace the image data simply by issuing the re-read command without having to issue a delete command in addition to the re-read command. This is very convenient for the user. In the above process, when the re-read command is issued, only one page of document on the automatic document feeder is read and the image data corresponding to the current preview image is replaced with the image data obtained by the re-reading. This makes it possible for the user to easily understand what page is to be deleted and what is to be inserted in place of the deleted page. Although in the present example, only one page of image data is deleted and replaced with image data obtained by the re-reading, plural pages of image data may be replaced with corresponding pages of image data obtained by re-reading.

On the other hand, in the case in which it is determined in step S3012 that the re-read command is not issued, the process returns to step S3005. The process waits in step S3005 until any command is issued.

Figure 11:
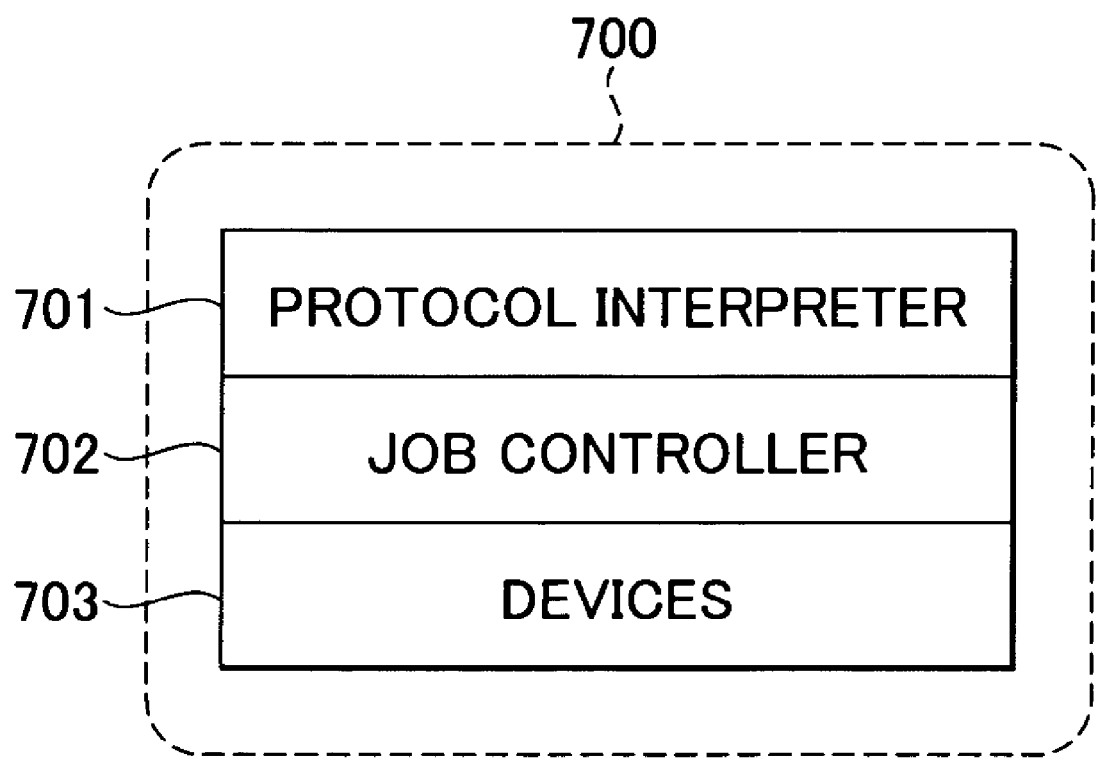
FIG. 11 is a diagram showing the structure of internal software of the controller shown in FIG. 1.

FIG. 11 a diagram illustrating the structure of internal software of the controller 110 shown in FIG. 1.

As shown in FIG. 11, software controller 700 includes a protocol interpreter 701, a job controller 702, and a device unit 703.

The protocol interpreter 701 interprets a command (protocol) received from the host computer 601 or the operation control unit 150 via the interfaces 411 to 414, and requests the job controller 702 to execute a job in accordance with the result of the interpretation.

In response to the request from the protocol interpreter 701, the job controller 702 executes the job.

The device unit 703 includes device drivers for controlling the respective physical device units of the image input/output system 100, wherein those device drivers are used by the job controller in executing the job.

Figure 12:
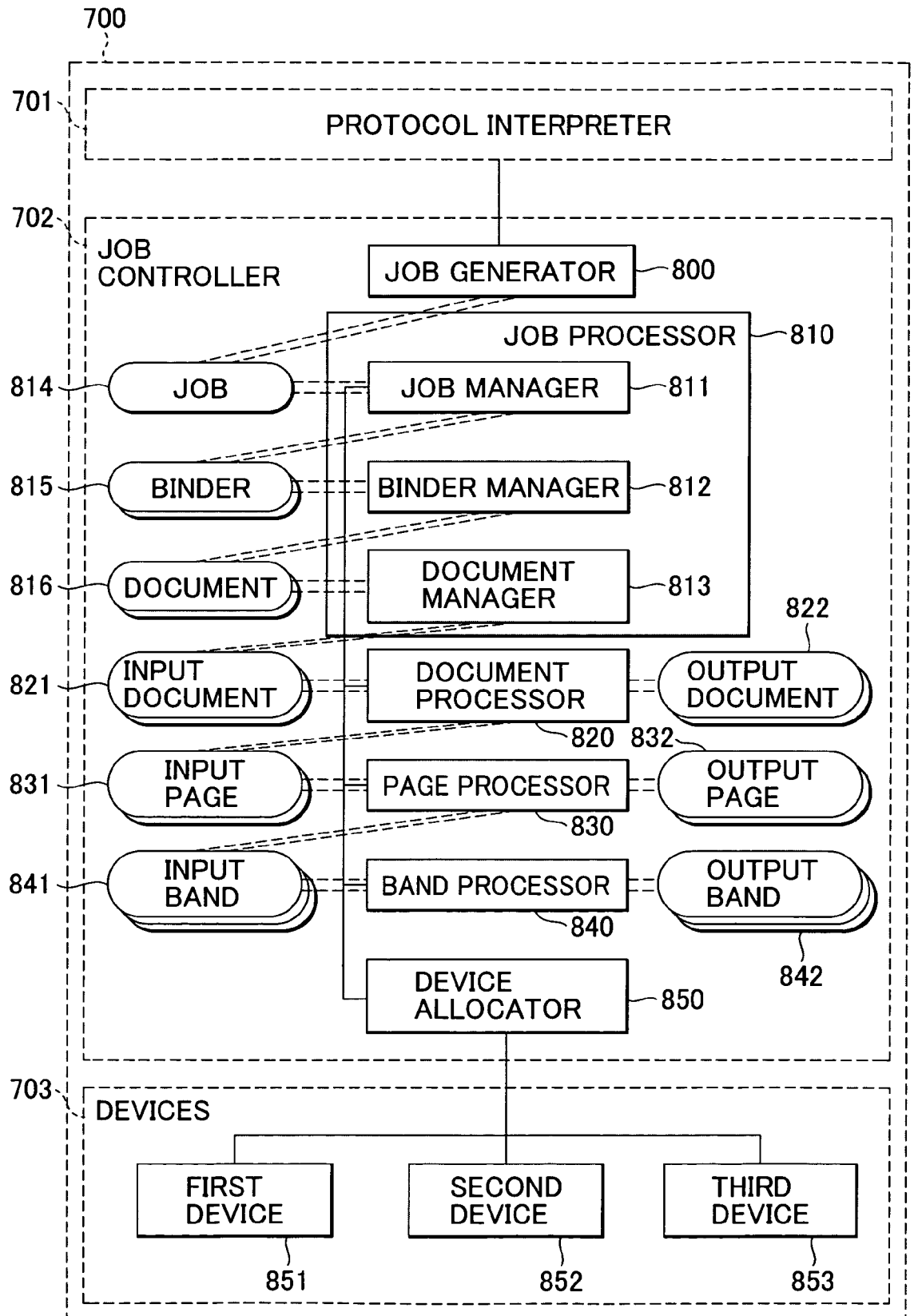
FIG. 12 is a diagram showing an example of a module configuration of a job controller shown in FIG. 11.

FIG. 12 shows an example of a module configuration of the job controller 702 shown in FIG. 11.

In FIG. 12, reference numeral 700 denotes the controller software, 701 denotes the protocol interpreter, 702 denotes the job controller, and 703 denotes the device unit.

The job controller 702 includes a job generator 800, a job processor 810, a document processor 820, a page processor 830, a band processor 840, and a device allocator 850.

The job processor 810 includes a job manager 811, a binder manager 812, and a document manager 813. The device unit 703 may include a plurality of devices. In the specific example shown in FIG. 12, the device unit 703 includes a first device 851, a second device 852, and a third device 853.

A request for operation is sent in the form of a command (protocol) from the host computer 601 or 602 or the operation control unit 150 via a corresponding interface (411 to 414). The protocol interpreter 701 interprets the received command and the resultant interpreted command is supplied to the job controller 702. Note that when the command is supplied to the job controller 702, the protocol interpreter 701 converts the command into a form that can be understood by the job controller 702.

The job generator 800 generates a job 814. Herein, the job 814 generated by the job generator 800 can be one of various jobs including a copy job, a print job, a scan job, or a facsimile job. The protocol interpreted by the protocol interpreter 701 includes information indicating, for example in the case of the print job, the name of document to be printed, the number of copies, and the output sheet tray to which to output the printed sheets, and also includes print data (PDL data). The generated job 814 is sent to the job processor 810, which processes the received job 814.

The job processor 810 implements settings associated with the entirety of the job 814. The job manger 811 implements settings associated with the job, such as the order of outputting binders that form the job. Each binder manager 812 implements settings associated with the corresponding binder, such as the order of outputting documents that form the binder. Each document manager 813 implements settings associated with the corresponding document, such as the order of outputting pages that form the document.

In the job processor 810, the job 814 is divided, except for the data indicating the setting(s) associated with the entirety of the job 814, into a plurality of portions called binders 815, and each binder 815 is divided, except for the data indicating the settings associated with the entirety of the binder 815, into a plurality of still smaller portions called documents 816.

Each document 816 is related, on a one-to-one basis, to a corresponding input document 821. The document processor 820 converts each input document 821 into an output document 822. For example, in the case of a scan job in which a set of document sheets is read by the scanner and converted into a plurality of image data, the input document 821 is data indicating the setting(s) associated with the set of the document sheets and indicating the procedure to be performed, and the output document 822 is data indicating the setting(s) associated with the set of the image data and indicating the procedure to be performed. The document processor 820 serves to produce a set of image data from a set of sheets of paper of a given document.

The document processor 820 converts the input document 821 into the output document 822, wherein the document processor 820 divides the document 816, except for the data indicating the setting(s) associated with the entirety of the document 816, into a plurality of still smaller portions called pages 831, and the document processor 820 requests the page processor 830 to process the pages 831.

Dividing of a document into pages is analogous to dividing of a job, performed by the job processor 810, into binders 815 and further into documents 816 so that the job processor 810 can deal with only the process associated with the entirety of the job. A specific example of document-level setting/processing is setting/processing associated with the order of pages such as sorting of pages, selection of double-sided printing, addition of a cover page, and insertion of transparency sheets.

The page processor 830 converts each input page 831 into an output page 832. For example, in the case of the scan job described above, each input page 831 includes data indicating setting/procedure such as the reading resolution and the reading direction (landscape or portrait), while each output page 832 includes data indicating setting/procedure such as the storage location where to store the image data.

The manner of dividing a job into a plurality of smaller and smaller portions finally into pages has been described above. If the system is allowed to have a page memory having a storage capacity of one page (provision of such a page memory results in an increase in cost of the system), it is not necessary to further divide each page into smaller portions.

However, when the system does not have a page memory having a storage capacity of one page, the job 814 is processed using a memory (band memory) having a small storage capacity capable of storing only a few lines. In this case, each page is further divided into a plurality of portions called bands. More specifically, the band processor 840 converts each input band 841 into an output band 842 in a similar manner to the manner in which each page is processed.

When the job processor 810, the document processor 820, the page processor 830, and the band processor 840 perform processing, they use various physical devices included in the image input/output system 100.

If a plurality of these processors operate at the same time, competition occurs in terms of usage of the various physical devices. Device allocator 850 arbitrates the use of the devices. The first to third devices 851 to 853 described above are logical devices allocated, by the device allocator 850, to the processors described above. Specific examples of devices include the page memory, the band memory, the document feeder 250, the marking unit 320, and the scanner unit 210.

FIG. 13 shows the configuration of the document manager 900 for managing image data stored in the image storage unit 160 shown in FIG. 1.

As shown in FIG. 13, the document manager 900 includes the folder manager 901, the job manager 902, the binder manager 903, the document manager 904, and the page manager 905, wherein each manager has its own management information (attribute information).

More specifically, the document manager 900 includes one or more folder managers 901 and has management information associated with each folder manager 901. Each folder manager 901 includes one or more job managers 902 and has management information associated with each job manager 902.

Each job manager 902 includes one or more binder managers 903 and has management information associated with each binder manager 903. Each job manager 902 can store attribute information which is stored in the job manager 811 and which is necessary in processing the job 814 by the job controller 702.

Each binder manager 903 includes one or more document managers 904 and has management information associated with each document manager 904. Each binder manager 903 can store attribute information which is stored in the binder manager 812 and which is necessary in processing the binder 815 by the job controller 702.

Each document manager 904 includes one or more page managers 905 and has management information associated with each page manager 905. Each document manager 904 can store attribute information which is stored in the document manager 813 and which is necessary in processing the document by the job controller 702 and also store attribute information associated with the output document 822 processed by the document processor 820.

Each page manager 905 is related to one page of image data obtained via reading performed by the scanner and stored in the image storage unit 160, or one page of image data produced on the basis of PDL data received from the host computer 601 or 602, or one page of image data received from the facsimile unit. Each page manager 905 can store an attribute value associated with an output page 832 processed by the page processor 830 in the job controller 702.

Thus, it is possible to reproduce the job 814, generated when the image data is stored, from the information stored in the document manager 900 and the image data stored in the image storage unit 160. It is also possible to execute the job in a manner different from the originally specified manner, by resetting the stored information.

Figure 14:
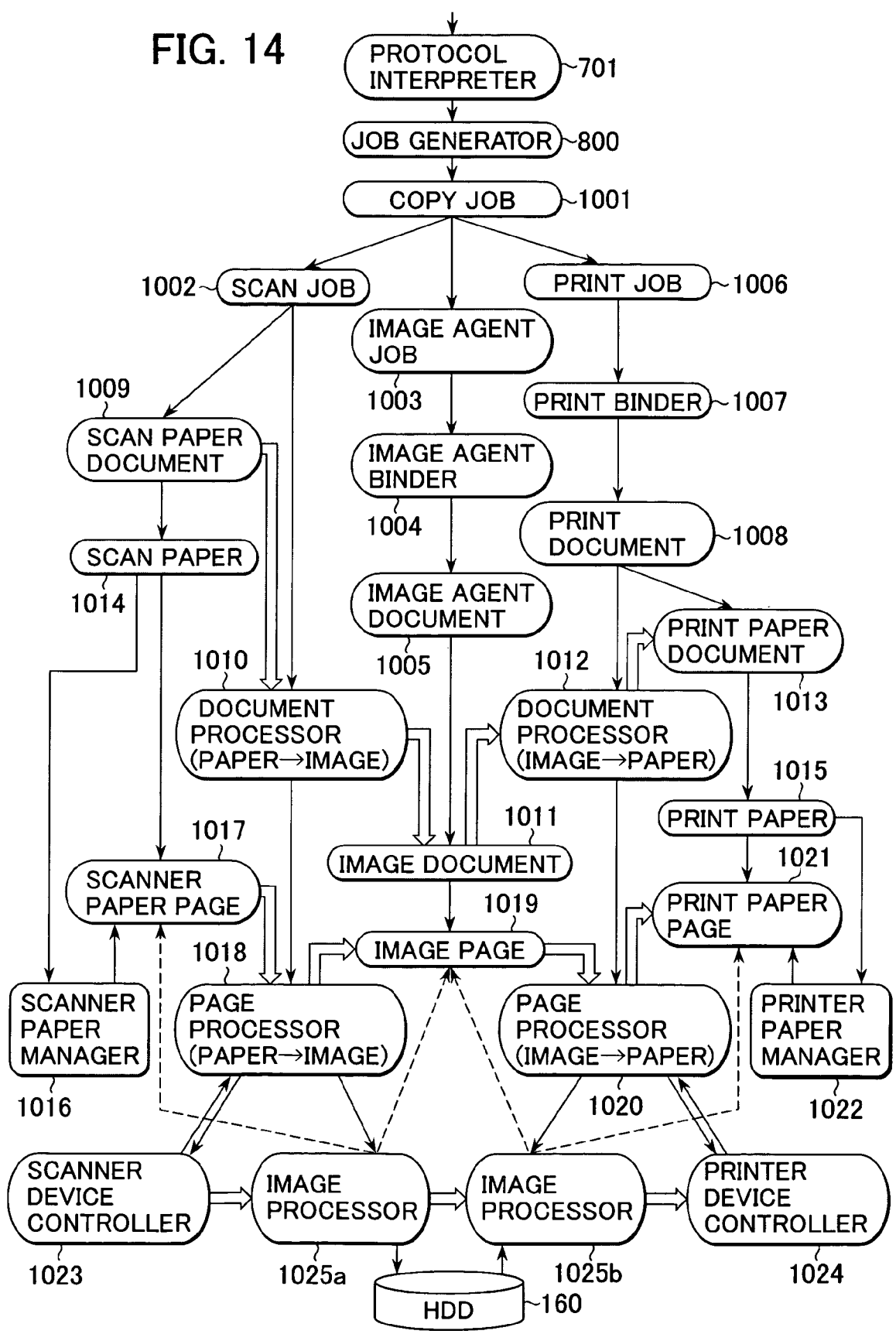
FIG. 14 is a diagram showing an example of a construction of a copy job, which is one of jobs executed by the controller shown in FIG. 1.

FIG. 14 shows an example of a copy job, which is one of jobs 814 executed by the controller 110 shown in FIG. 1.

In FIG. 14, a request for operation is sent in the form of a command (protocol) from the host computer 601 or 602 shown in FIG. 1 or from the operation control unit 150 via a corresponding interface (411 to 414 shown in FIG. 4).

The received command is interpreted by the protocol interpreter 701 and the resultant interpreted command is sent to the job controller 702. Note that when the command is supplied to the job controller 702, the protocol interpreter 701 has converted the command into a form that can be understood by the job controller 702.

The job generator 800 interprets the received command and produces a copy job 1001. The job generator 800 issues a request for executing the produced copy job 1001. The copy job 1001 has the capability of performing a copying process by producing a scan job 1002, an image agent job 1003, and a print job 1006 and controlling those produced jobs.

The image agent job 1003 divides itself into smaller portions, each of which divides itself into still smaller portions, and so on. More specifically, the image agent job 1003 produces image agent binders 1004 and requests the agent binders 1004 to perform the details of the process, and each image agent binder 1004 produces image agent documents 1005 and requests the image agent documents to perform the details of the process, and so on. The image agent document 1005 produces an image document 1011, which is an output document to be output by the document processor (paper→image) 1010. The produced image document 1011 is sent to the scan job 1002 and the print job 1006 via the image agent document 1005, the image agent binder 1004, the image agent job 1003, and the copy job 1001.

The scan job 1002 produces a scan paper document 1009, which is an input document to be input to a document processor (paper→image) 1010, and then produces the document processor (paper→image) 1010. When the document processor (paper→image) 1010 is produced, the document processor (paper→image) 1010 is informed that the scan paper document 1009 is specified as the input document and the image document 1011 is specified as the output document. Thereafter, the scan job 1002 requests the document processor (paper→image) 1010 to process the scan paper document 1009 and controls the process performed by the document processor (paper→image) 1010.

In the scan job 1002, the job processor 810 performs setting/processing associated with the entirety of the scan job 1002 and also performs setting/processing associated with binders. In the scan job 1002, the physical structure of the scanner unit 210 and that of the document feeder unit 250 allow one scanning operation to be controlled by one job, one binder, and one document, and thus, in the present embodiment, the binder 815 and the document 816 are omitted.

In the scan paper document 1009, information associated with a document is managed in the form of attribute information. In the image document 1011, information associated with image data obtained via the scanning process is managed in the form of attribute information. On the basis of those attribute information, the document processor (paper→image) 1010 controls the process of converting the scan paper document 1009 given as the input document into the image document 1011 specified as the output document.

The document processor (paper→image) 1010 performs only processing that should be performed on the document as a whole, but details of the processing are performed by the scan paper page 1017, the page processor (paper→image)

1018, and the image page 1019. The scan paper document 1009 sequentially produces scan paper 1014 corresponding to the respective original document sheets.

When a scan paper 1014 is produced, an identifier thereof is registered in the scanner paper manger 1016 that manages the order of processing document pages. Thereafter, the scan paper 1014 produces a scan paper page 1017. The scan paper page 1017 corresponds to an upper-side page or a lower-side page of a document sheet. In the case in which each document sheet has images on both upper-side page and lower-side page, each scan paper 1014 produces two scan paper page 1017.

The scanner paper manger 1016 determines the order of processing scan paper pages 1017 on the basis of the identifier of the scan paper 1014 and the specifications (i.e., the scanning order) of the device. In the scan paper page 1017, information associated with the corresponding page of the document is described, and information associated with scanned image data of the corresponding page is described in the image page 1019 produced by the image document 1011.

The page processor (paper→image) 1018 controls the conversion from the scan paper page 1017 given as an input page into the image page 1019 specified as an output page. The page processor (paper→image) 1018 controls the process sequence performed by the physical scanner device. More specifically, the page processor (paper→image) 1018 controls the document scanning operation by issuing an engine control command acceptable by the scanner device controller 1023.

Furthermore, the attribute information described in the scan paper page 1017 and that described in the image page 1019 are set in the image processor 1025a thereby storing the image data of the document into the image storage unit 160. The document manager 900 manages the stored image data. The stored image data can be read, copied, moved, and deleted via the document manager 900.

The image processors 1025a and 1025b include control data associated with resolution conversion, code conversion, etc.

The print job 1006 divides itself, except for setting/processing associated with the print job 1006 as a whole, into a plurality of portions called print binders 1007, and further into a plurality of still smaller portions called print documents 1008, except for setting/processing associated with each printer binder 1007 as a whole. The print job 1006 controls the printing process by controlling the print binders 1007 and the print documents 1008.

After the print document 1008 produces a print paper document 1013 as an output document to be output from a document processor (image→paper) 1012, the printer document 1008 produces the document processor (image→paper) 1012. At this stage of the processing, the document processor (image→paper) 1012 is informed that the image document 1011 is specified as the input document and the print paper document 1013 is specified as the output document. In response to a request from the print document 1008, the document processor (image→paper) 1012 performs processing under the control of the print document 1008.

In the print paper document 1013, attribute information associated with print output is described, and attribute information associated with image data is described in the image document 1011. In accordance with those attribute information, the document processor (image→paper) 1012 controls the conversion from the image document 1011 given as the input document into the print paper document 1013 specified as the output document. The document processor (image→paper) 1012 performs only processing associated with the document as a whole, but details of the processing are performed by the image page 1019, the page processor (image→paper) 1020, and the print paper page 1021.

The print paper document 1013 sequentially produces as many print paper's 1015 as there are document pages to be printed. When each print paper 1015 is produced, the print paper 1015 registers its identifier in the print paper manager 1022 that controls the order of printing, and the print paper 1015 produces a print paper page 1021. The print paper page 1021 corresponds to an upper-side page or a lower-side page of a document sheet. In the case in which each document sheet has images on both upper-side page and lower-side page, each print paper 1015 produces two print paper pages 1021.

The print paper manager 1022 determines the order of processing print paper pages 1021 on the basis of the identifiers of the print paper's 1015 and the specifications (i.e., the number of sheets internally circulated, the processing order for double-sided printing, etc.) of the device. In each print paper page 1021, information associated with the page to be printed is described, and information associated with image data of the page is described in the image page 1019. The page processor (image X paper) 1020 controls the conversion from the image page 1019 given as the input page into the print paper page 1021 specified as the output page.

The page processor (image→paper) 1020 controls the process sequence performed by the physical printer device. More specifically, the page processor (image→paper) 1020 controls the printing operation by issuing an engine control command acceptable by the printer device controller 1024. Furthermore, the attribute information described in the image page 1019 and that described in the print paper page 1021 are set in the image processor 1025b thereby printing the image data stored in the image storage unit 160 on printing paper.

As described above, the copying operation is accomplished in such a manner that the job is divided into smaller and smaller portions and processed by the corresponding processors.

Figure 15:
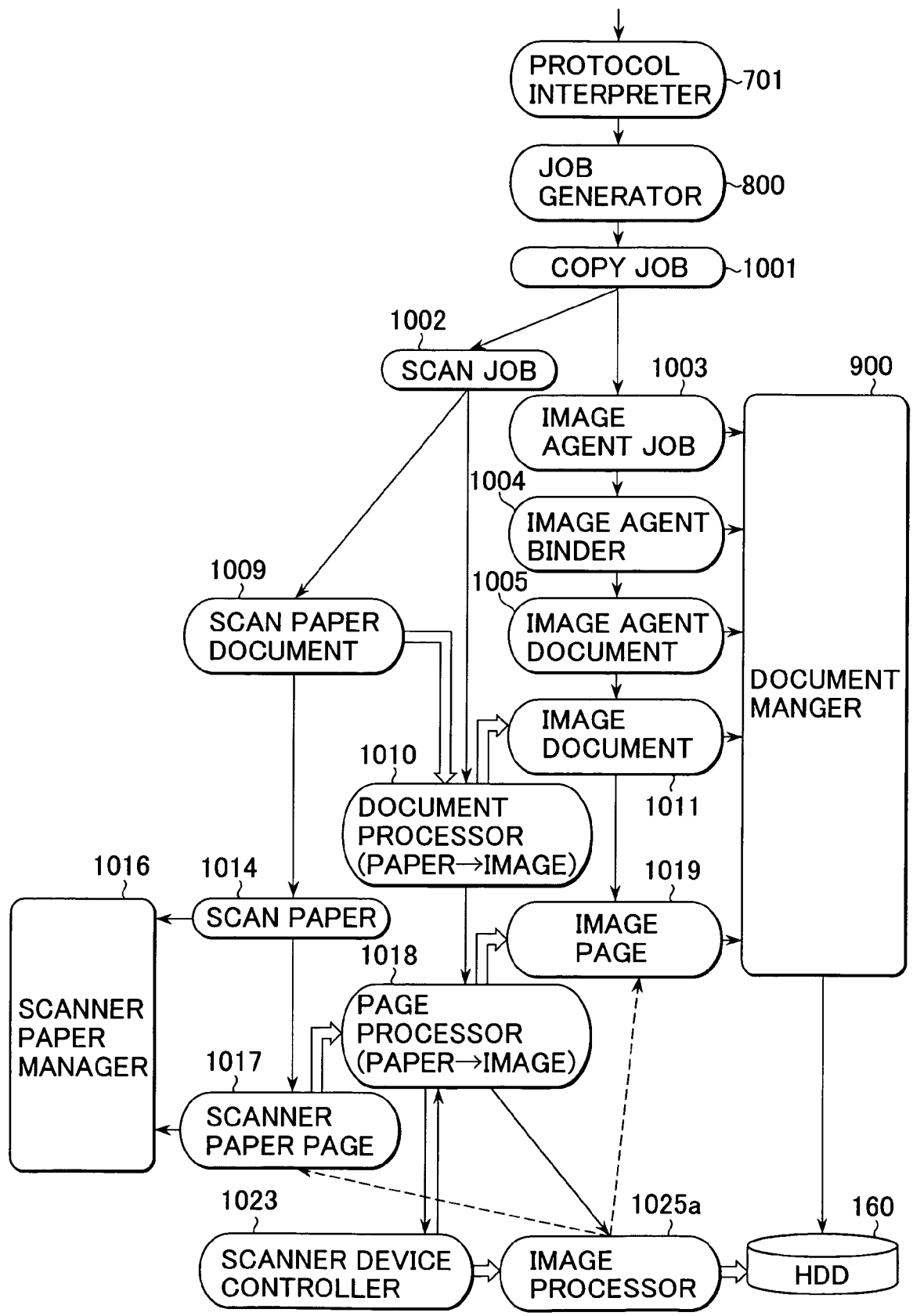
FIG. 15 is a diagram showing an example of a manner in which attribute information is stored into the document manager when the copy job shown in FIG. 14 is executed.

FIG. 15 is a diagram showing an example of a manner in which attribute information is stored into the document manager 900 when the copy job 1001 shown in FIG. 14 is executed, wherein attribute information not shown in FIG. 14 is shown herein.

As described above with reference to FIG. 13, the document manager 900 includes the folder manager 901, the job manager 902, the binder manager 903, the document manager 904, and the page manager 905, wherein those managers have their own management information (attribute information).

The attribute information, which is stored in the job manager 811 and which is necessary in performing the job 814 by the job controller 702, is stored by the image agent job 1003 into the job manager 902 of the document manager 900. The image agent binder 1004 stores the attribute information, which is stored in the binder manager 812 and which is necessary in performing the job 815 by the job controller 702, into the binder manager 903 of the document manager 900. The attribute information, which is stored in the document manager 813 and which is necessary in processing performed by the job controller 702 and the attribute information associated with the output document 822 processed by the document processor 820 are stored, by the image document 1011 corresponding to the output document, into the document manager 904 of the document manager 900. The attribute information associated with the output page 832 processed by the page processor 830 of the job controller 702 is stored, by the image page 1019 corresponding to the output page, into the page manager 905 of the document manager 900.

Figure 16:
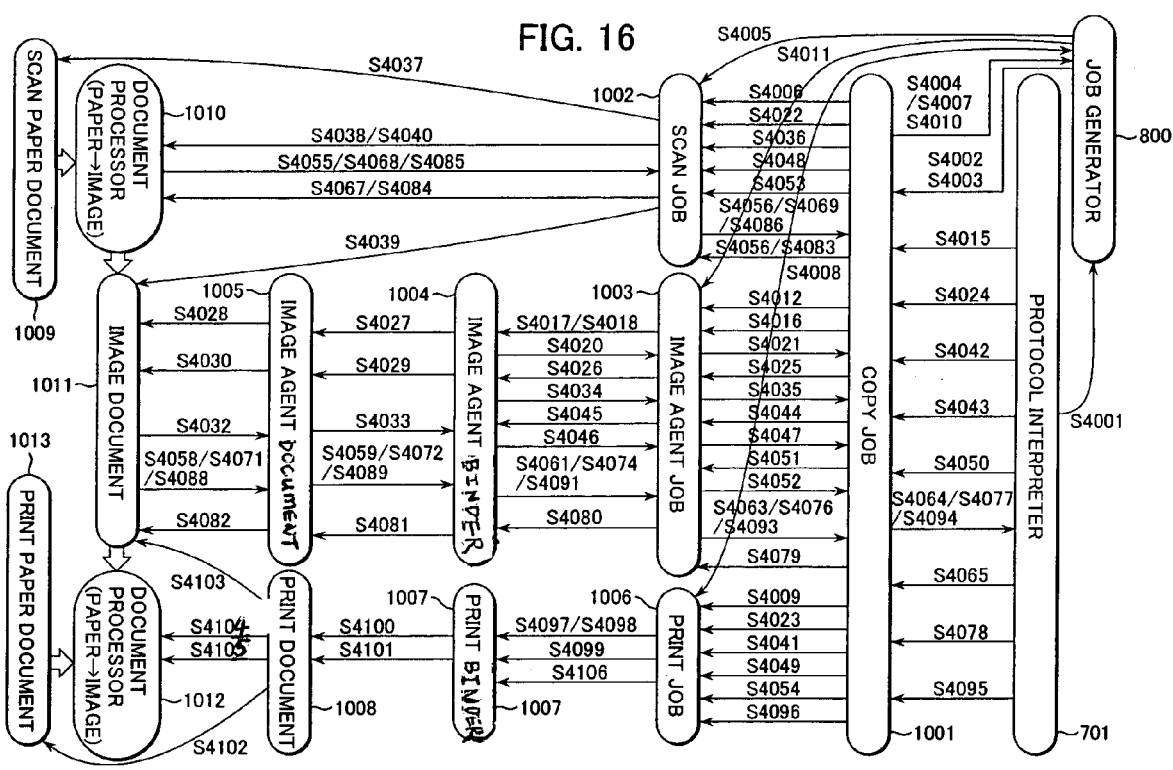
FIG. 16 is a diagram showing an example of a control sequence of a copy job performed by the image processing apparatus according to the present invention.
Figure 17:
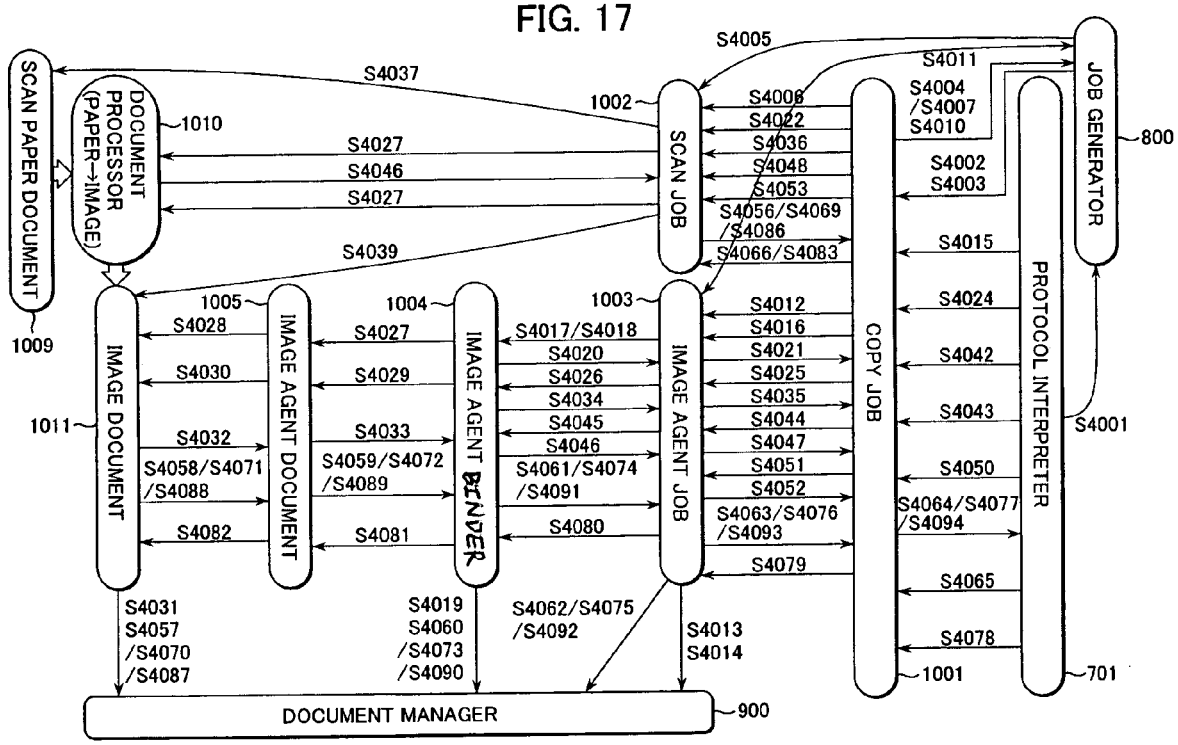
FIG. 17 is a diagram showing an example of a control sequence of a copy job performed by the image processing apparatus according to the present invention.

Referring to FIGS. 16 and 17, an example of a control sequence of a copy job performed by the image processing apparatus according to the present invention is described below.

FIG. 16 shows an example of a control sequence of a copy job performed by the image processing apparatus according to the present invention, wherein the part of control sequence associated with the document management in the copy job is shown in FIG. 17. In FIGS. 16 and 17, the control sequence associated with the scan paper document 1009, the document processor (paper→image) 1010, the image document 1011, the document processor (image→paper) 1012, and the print paper document 1013 is shown.

Sequence in the Binding Reading Mode

A request for an operation from the operation control unit 150 is sent in the form of a command (protocol). The protocol interpreter 701 interprets the received command and the resultant interpreted command is sent to the job controller 702. Note that when the command is supplied to the job controller 702, the protocol interpreter 701 converts the command into a form that can be understood by the job controller 702.

In step S4001, in accordance with the result of the interpretation, the protocol interpreter 701 requests the job generator 800 to generate a copy job 1001. In step S4002, in response to the request, the job generator 800 generates the copy job 1001 and starts the copy job 1001 (in step S4003).

If the copy job 1001 is started in step S4003, then, in step S4004, the copy job 1001 requests the job generator 800 to generate a scan job 1002 that is needed in performing the copying process.

In step S4005, in response to the request from the copy job 1001, the job generator 800 generates the scan job 1002 and informs the copy job 1001 of the handle of the generated scan job 1002. By using this handle, the copy job 1001 starts the generated scan job 1002 (in step S4006).

Furthermore, in step S4007, the copy job 1001 requests the job generator 800 to generate a print job 1006. In step S4007, in response to the request from the copy job 1001, the job generator 800 generates the print job 1006 and informs the copy job 1001 of the handle of the generated print job 1006.

By using this handle, the copy job 1001 starts the generated print job 1006 (in step S4009). Thereafter, in step S4010, the copy job 1001 requests the job generator 800 to generate an image agent job 1003.

In step S4011, in response to the request from the copy job 1001, the job generator 800 generates the image agent job 1003 and informs the copy job 1001 of the handle of the generated image agent job 1003. By using this handle, the copy job 1001 starts the generated image agent job 1003 (in step S4012).

The copy job 1001 performs a copying operation by controlling the scan job 1002, the image agent job 1003, and the print job 1006, which are produced via the above-described procedure. If the image agent job 1003 is started by the copy job 1001, the image agent job 1003 produces a folder, used to store attribute information, in the document manager 900 (step S4013 in FIG. 17) and produces a job (step S4014 in FIG. 17).

Thereafter, the protocol interpreter 701 registers binders of the job in the copy job 1001 (S4015). If the binders are registers in the copy job 1001, the copy job 1001 registers the binders in the image agent job 1003 (S4016).

If the binders are registered in the image agent job 1003, the image agent job 1003 produces an image agent binder 1004 (S4017) and starts the produced image agent binder 1004 (S4018).

If the image agent binder 1004 is started by the image agent job 1003, the image agent binder 1004 produces a binder for use in storing attribute information in the document manager 900 (S4029 FIG. 17). Thereafter, the image binder 1004 informs the image agent job 1003 of the completion of the registration of the binder (S4020).

If the image agent job 1003 receives the notification of the completion of registration of the binder from the image agent binder 1004, the image agent job 1003 notifies the copy job 1001 of the completion of the registration of the binder (S4021). In response to receiving this notification, the copy job 1001 registers the binder in the scan job 1002 (S4022) and registers the binder in the print job 1006 (S4023).

The protocol interpreter 701 registers documents of the binder in the copy job 1001 (S4024). If the documents are registered in the copy job 1001, the copy job 1001 registers the documents in the image agent job 1003 (S4025).

If the documents are registered in the image agent job 1003, the image agent job 1003 registers the documents in the image agent binder 1004 (S4026). If the documents are registered in the image agent binder 1004, the image agent binder 1004 produces an image agent document 1005 (S4027).

If the image agent document 1005 is produced, the image agent document 1005 produces an image document 1011 (S4028). Thereafter, the image agent binder 1004 starts the image agent document 1005 (S4029), and the image document 1011 is started by the image agent document 1005 (S4030).

If the image document 1011 is started by the image agent document 1005, the image document 1011 produces a document of the document manger 900, for use in storing attribute information (S4031 in FIG. 17). Thereafter, the image agent document 1005 is informed that the image document 1011 has been started (S4032).

If the image agent document 1005 is notified that the image document 1011 has been started, the image agent document 1005 notifies the image agent binder 1004 that the document has been started (S4033). In response, the image agent binder 1004 notifies the image agent job 1003 that the document has been started (S4034). In response, the image agent job 1003 notifies the copy job 1001 that the document has been started (S4035).

In response, the copy job 1001 registers the document in the scan job 1002 (S4036). If the document is registered in the scan job 1002, the scan job 1002 produces a scan paper document 1009 as an input document (S4037) and produces a document processor (paper→image) 1010 that is to process the scan paper document 1009 as an input document so as to output the image document 1011 as an output document.

Thereafter, the order of printing image data in the image document 1011 specified as the output document is set (S4039), and the document processor (paper→image) 1010 is started (S4040).

If the copy job 1001 receives the notification of the start of the document, the copy job 1001 registers the document in the print job 1006 (S4041). Thereafter, the protocol interpreter 701 sends a document end command to the copy job 1001 (S4042) and a binder end command to the copy job 1001 (S4043).

In response, the image agent job 1003 is informed that the binder has been ended (S4044). If the image agent job 1003 is informed that the binder has been ended, the image agent job 1003 informs the image agent binder 1004 that there are no more documents to be registered (S4045).

If the image agent binder 1004 is informed that the registration of documents has been completed, the image agent binder 1004 notifies the image agent job 1003 that the binders have been established (S4046), and the image agent job 1003 notifies the copy job 1001 that the binders have been established (S4047).

If the copy job 1001 is notified that the binders have been established, the copy job 1001 notifies the scan job 1002 (S4048) and the print job 1006 (S4049) that the binder has been ended.

The protocol interpreter 701 notifies the copy job 1001 that the sequence of job scripts has been completed (S4050). If the copy job 1001 is notified that the job scripts have been ended, the copy job 1001 informs the image agent job 1003 that the job scripts have been ended (S4051). If the image agent job 1003 is notified that the job scripts have been ended, the image agent job 1003 notifies the copy job 1001 that the job has been established (S4052).

In response, the copy job 1001 notifies the scan job 1002 and the print job 1006 that the job scripts have been ended (steps S4053 and S4054).

On the other hand, if scanning of the document in the scanning process started in step S4040 is completed, the document processor (paper→image) 1010 notifies the scan job 1002 that the scanning has been completed (S4055). In response, the scan job 1002 notifies the copy job 1001 that scanning has been completed (S4056).

If the actual scanning of the image data is completed, the image document 1011 stores the attribute information in the document manager 900 (step S4057 in FIG. 17), and the image document 1011 notifies the image document 1005 that the attribute information has been stored (S4058). If the image agent document 1005 is notified that the attribute information has been stored, the image agent document 1005 notifies the image agent binder 1004 that the attribute information has been stored (S4059). If the image agent binder 1004 is notified that the attribute information has been stored, the image agent binder 1004 stores the attribute information associated with the binder in the document manager 900 (S4060 in FIG. 17).

If the storing of the attribute information of the binder is completed in the above-described manner, the image agent binder 1004 notifies the image agent job 1003 that the storing of the attribute information is completed (S4061). In response, the image agent job 1003 stores the attribute information in the document manager 900 (S4062 in FIG. 17). After completion of storing the attribute information, the image agent job 1003 notifies the copy job 1001 that the attribute information has been stored (S4063).

In response, the copy job 1001 notifies the protocol interpreter 701 that the scanning is completed (S4064). The protocol interpreter notifies the external job issuer (i.e., a host computer on the network or the operation control unit) that the scanning is completed. From the received notification, the job issuer can understand that the image data obtained via the scanning process has been stored.

Sequence in the Binding Reading Mode

The sequence in the binding reading mode is described below. In the binding reading mode described above, if one or more new document pages are read, the obtained image data is stored at a location after the end of the existing image data. After completion of reading all document pages, all image data is dealt with as a single set of image data.

First, the protocol interpreter 701 sends a scan command to the copy job 1001 (S4065). In response to receiving the scan command, the copy job 1001 sends the scan command to the scan job 1002 (S4066). In response, the scan job 1002 sends the scan command to the document processor (paper→image) 1010 (S4067).

When scanning of the document fed from the DF or on the platen is completed, the document processor (paper→image) 1010 informs the scan job 1002 that the scanning is completed (S4068). In response, the scan job 1002 notifies the copy job 1001 that the scanning is completed (S4069). If storing of the image into the document manger 900 is actually completed, the image document 1011 stores the attribute information into the document manager 900 (S4070 in FIG. 17), and the image document 1011 notifies the image agent document 1005 that the attribute information has been stored (S4071).

If the image agent document 1005 receives the notification indicating the attribute information has been stored, the image agent document 1005 notifies the image agent binder 1004 that the attribute information has been stored (S4072). In response, the image agent binder 1004 stores the attribute information associated with the binder into the document manager 900 (S4073 in FIG. 17). After completion of storing the attribute information associate with the binder, the image agent binder 1004 notifies the image agent job 1003 that the storing of the attribute information is completed (S4074).

In response, the image agent job 1003 stores the attribute information into the document manager 900 (S4075 in FIG. 17). After completion of storing the attribute information, the image agent job 1003 notifies the copy job 1001 that the attribute information has been stored (S4076).

In response, the copy job 1001 notifies the protocol interpreter 701 that the scanning is completed (S4077). The protocol interpreter notifies the external job issuer (i.e., a host computer on the network or the operation control unit) so that the job issuer can recognize that storing of image data in the binding reading mode is completed. The above-described process can be performed repeatedly until the copy job 1001 is notified that the scanning is completed (S4095).

Sequence of Re-Scanning Operation

A sequence of re-scanning process is described below. As described earlier, re-scanning is performed to replace a particular already-stored image data with new image data obtained by re-scanning process.

First, the protocol interpreter 701 sends a re-scan command to the copy job 1001 (S4078). In response to receiving the re-scan command, the copy job 1001 sends a command to the image agent job 1003 to delete the specified image data (S4079). If the image agent job 1003 receives the image data delete command, the image agent job 1003 sends the image data delete command to the image agent binder 1004 (S4080). In response, the image agent binder 1004 sends the image data delete command to the image agent document 1005 (S4081). In response, the image agent document 1005 sends the image data delete command to the image document 1011 (S4082). The image document 1011 detects an image page 1019 specified by the image data delete command from image pages managed by the image document 1011, and the image document 1011 sends the image data delete command to the detected image page 1019. Thus, the specified image data is actually deleted from the image storage unit 160.

In the above process, the storage location of the associated attribute information in the document manager 900 is also detected and the data indicating the storage location is stored. The copy job 1001 sends a scan command to the scan job 1002 (S4083). The scan job 1002 sends the scan command to the document processor (paper→image) 1010 (S4084). When scanning of the document fed from the DF or on the platen is completed, the document processor (paper→image) 1010 notifies the scan job 1002 that the scanning has been completed (S4085). In response, the scan job 1002 notifies the copy job 1001 that scanning has been completed (S4086).

If storing the image data into the image storage unit 160 is completed, the image document 1011 stores attribute information at the same storage location in the document manager 900 as the storage location at which the attribute information of the deleted image data is stored (S4087 in FIG. 17), and the image document 1011 notifies the image agent document 1005 that the attribute information has been stored (S4088). In response to receiving the notification indicating that the attribute information has been stored, the image agent document 1005 notifies the image agent binder 1004 that the attribute information has been stored (S4089). In response to receiving the notification, the image agent binder 1004 stores the attribute information associated with the binder at the reserved location in the document manager 900 (S4090 in FIG. 17).

If storing of the attribute information of the binder is completed in the above-described manner, the image agent binder 1004 notifies the image agent job 1003 that the storing of the attribute information is completed (S4091). In response, the image agent job 1003 stores the attribute information at the reserved location in the document manager 900 (S4092 in FIG. 17). After completion of storing the attribute information, the image agent job 1003 notifies the copy job 1001 that the attribute information has been stored (S4093).

In response, the copy job 1001 notifies the protocol interpreter 701 that the scanning is completed (S4094). The protocol interpreter notifies the external job issuer (i.e., a host computer on the network or the operation control unit) so that the job issuer can recognize that the image data has been successfully obtained by the re-scanning and has been stored. Note that the re-scanning may be performed for one page or a plurality of pages.

Sequence of Printing of Stored Image Data

Now, the sequence of printing stored image data is described below.

The protocol interpreter 701 informs the copy job 1001 that the scanning is completed (S4095). If the copy job 1001 is notified that the scanning is completed, the copy job 1001 issues a command to the print job 1006 to output all image data that has been scanned and stored (S4096). In response to receiving the command to output the image data, the print job 1006 produces a print binder 1007 (S4097) and starts the produced print binder 1007 (S4098). After starting the print binder 1007, the print job 1006 registers the documents (S4099).

In response, the print binder 1007 produces a print document 1008 in step S4100 and starts the print document 1008 in step S4101. If the print document 1008 is started, the print document 1008 produces a print paper document 1013 as an output document (S4102) and the print document 1008 implements settings associated with reading of image data, such as the reading order (i.e., ascending order or descending order), or designation of pages to be printed (i.e., specific pages or all pages) (S4103).

Thereafter, in step S4104, the print document 1008 produces a document processor (image→paper) 1012 that is to convert the image document 1011 specified as the input document into the print paper document 1013 specified as the output document. In step S4105, the print document 1008 starts the document processor (image→paper) 1012.

Via the steps described above, all image data, which is stored in the image storage unit 160 and which is managed by the image page 1019 under the control of the image document 1011, is printed.

In step S4106, the print job 1006 notifies the print binder 1007 that registration of documents is completed. Thus, this makes it possible for the print binder 1007 to determine which is the last one of print documents the print binder 1007 has to process. Although not shown in the figure, when each object completes a given process, the object notifies a higher-level object that the given process is completed. In turn, when the higher-level object completes processing of all objects it has produced and it deletes the objects, it notifies any higher-level object that the processing of all objects is completed. This is repeated from the lowest-level object to the highest-level object, and the copy job 1001 is eventually completed and deleted.

In the above-described manner, reading in the binding reading mode, re-reading, and printing of stored image data are performed.

Figure 18:
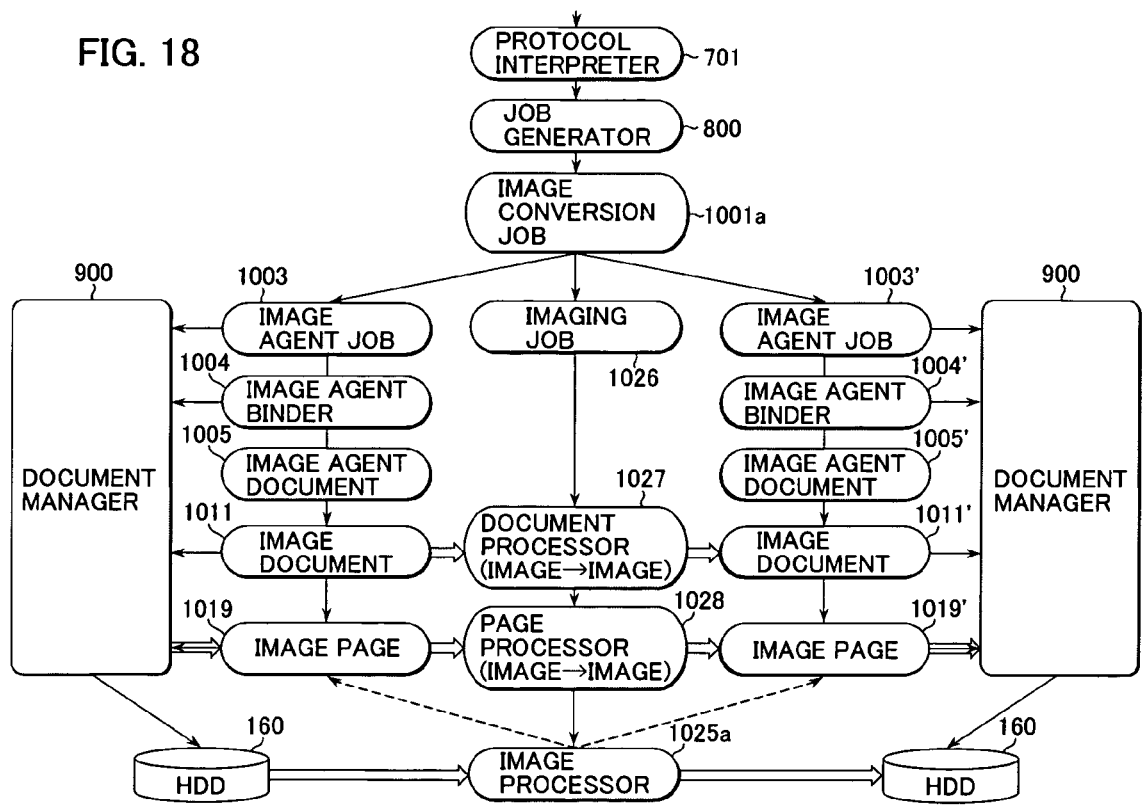
FIG. 18 is a diagram showing an example of a construction of an image conversion job executed by the controller shown in FIG. 1.

FIG. 18 shows an example of an image conversion job that is one of jobs 814 executed by the controller 110 shown in FIG. 1. This image conversion job is executed to produce preview image data from stored image data.

In FIG. 18, a request for operation is sent in the form of a command (protocol) from the host computer 601 or 602 or from the operation control unit 150 via a corresponding interface (411 to 414). The protocol interpreter 701 interprets the received command and the resultant interpreted command is sent to the job controller 702.

Note that when the command is supplied to the job controller 702, the protocol interpreter 701 interprets the command into a form that can be understood by the job controller 702. The job generator 800 interprets the received command and produces an image conversion job 1001a. The job generator 800 issues a request for executing the produced image conversion job 1001a. The image conversion job 1001a has the capability of accomplishing the image conversion processing. More specifically, the image conversion job 1001a produces an input image agent job 1003, an output image agent job 1003', and an imaging job 1026, and accomplishes the image conversion by controlling these jobs.

The input image agent job 1003 issues a request for performing a lower-level process to an input image agent binder 1004 and controls the processing performed by the input image agent binder 1004. In turn, the input image agent binder 1004 issues a request for performing a lower-level process to an input image agent document 1005 and controls the processing performed by the input image agent document 1005.

The input image agent document 1005 produces an image document 1011 as an input document to be input to the document processor (image→image) 1027, and the image document 1011 produces an image page 1019 corresponding to image data whose preview image is to be displayed in the preview screen area. The image page 1019 reads (acquires) the specified image data from the image storage unit 160. Similarly, the output image agent job 1003' issues a request for performing a lower-level process to an output image agent binder 1004' and controls the processing performed by the output image agent binder 1004'. The output image agent binder 1004' in turn issues a request for performing a lower-level process to an output image agent document 1005' and controls the processing performed by the output image agent document 1005'.

The output image agent document 1005' produces an image document 1011' as an output document to be output from the document processor (image→image) 1027. The image document 1011' produces an image page 1019' corresponding to preview image data that is to be acquired via the image conversion. The image data obtained via the image conversion is stored in the image storage unit 160.

The produced image document 1011' is transferred to the imaging job 1026 via the output image agent document 1005', the output image agent binder 1004', the output image agent job 1003', and the image conversion job 1001*a*.

When the imaging job 1026 produces the document processor (image→image) 1027, the imaging job 1026 specifies the image document 1011 as the input document to be input to the document processor (image→image) 1027 and specifies the image document 1011' as the output document. The imaging job 1026 issues a request for processing to the document processor (image→image) 1027 and controls the processing performed by the document processor (image→image) 1027.

Also in the imaging job 1026 as in the scan job 1002, setting/processing associated with the entirety of the imaging job 1026 and the setting/processing associated with the binder is performed by the job processor 810, and thus the binder 815 and the document 816 are omitted herein.

In the input image document 1011, attribute information associated with the image data stored in the image storage unit is described. On the other hand, in the output image document 1011', attribute information associated with the image data to be converted into the preview image data is described. In accordance with this attribute information, the document processor (image→image) 1027 controls the conversion from the image document 1011 given as the input document into the image document 1011' specified as the output document.

The document processor (image→image) 1011 performs only processing associated with the document as a whole, but details of the processing are performed by the image page 1019, the page processor (image→image) 1028, and the image page 1019'. The image document 1011 produces an image page 1019 corresponding to a particular page or all pages belonging to the document manager 904 in the document manager 900.

In the image page 1019 produced by the image document 1011, information associated with each page of the stored image data is described. The page processor (image→image) 1028 controls the conversion from the image page 1019 given as the input page into the image page 1019' specified as the output page. The page processor (image→image) 1028 has the capability of controlling the operation sequence of the image processing device and performs the image conversion by controlling the operation sequence of the image processing device.

As described above, the image conversion is accomplished by performing the processing in the hierarchical manner in which the job is divided into smaller and smaller portions and processed by the corresponding processors.

Figure 19:
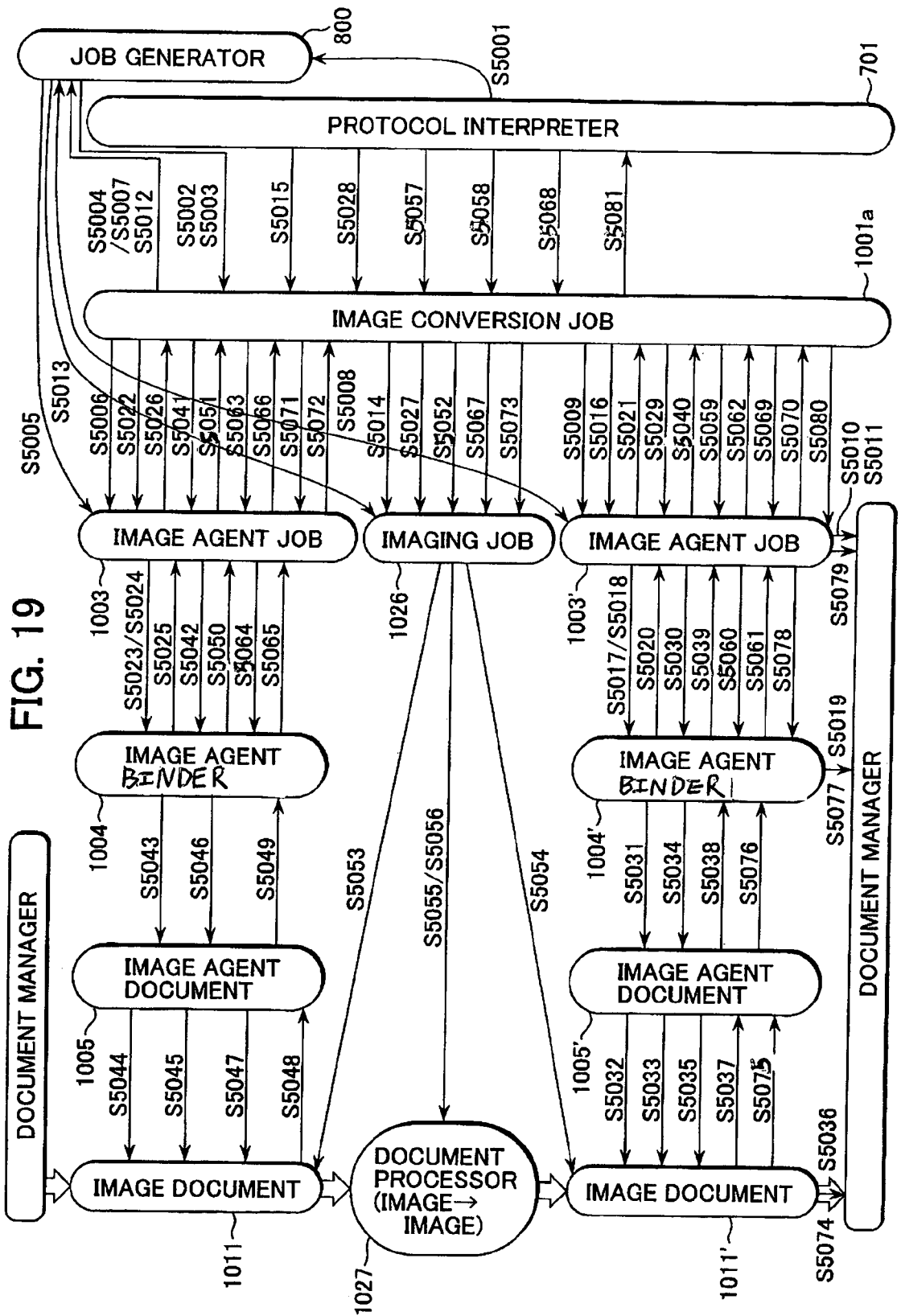
FIG. 19 shows an example of a control sequence of an image conversion job performed by the image processing apparatus according to the present invention.

FIG. 19 shows an example of a control sequence of an image conversion job performed by the image processing apparatus according to the present invention. In this example, the control sequence associated with the input image document 1011, the document processor (image→image) 1027, and the output image document 1011, is shown.

A request for an operation from the operation control unit 150 is output in the form of a command (protocol). The protocol interpreter 701 interprets the received command and the resultant interpreted command is sent to the job controller 702. Note that when the command is supplied to the job controller 702, the protocol interpreter 701 converts the command into a form that can be understood by the job controller 702.

In accordance with the result of the interpretation of the command, the protocol interpreter 701 issues, in step S5001, a request for generation of an image conversion job 1001*b* to the job generator 800. In step S5002, in response to receiving the request, the job generator 800 generates the image conversion job 1001*a* and starts it (S5003). If the image conversion job 1001*a* is started in step S5003, then, in step S5004, the image conversion job 1001*a* issues a request for generation of an input image agent job 1003 to the job generator 800.

In step S5005, in response to receiving the request from the image conversion job 1001*a*, the job generator 800 generates the input image agent job 1003 and sends data indicating the handle of the generated input image agent job 1003 to the image conversion job 1001*a*.

By using the handle, the image conversion job 1001*a* starts the generated input image agent job 1003 (S5006).

In step S5007, the image conversion job 1001*a* issues a request for generation of an output image agent job 1003' to the job generator 800. In step S5008, in accordance with the request from the image conversion job 1001*a*, the job generator 800 generates the output image agent job 1003' and sends data indicating the handle of the generated output image agent job 1003' to the image conversion job 1001*a*.

By using this handle, the image conversion job 1001*a* starts the generated output image agent job 1003' (S5009). If the output image agent job 1003' is started, then, in step S5010, the output image agent job 1003' produces a folder for use in storing attribute information in the document manger 900. Subsequently, in step S5011, the output image agent job 1003' produces a job.

In step S5012, the image conversion job 1001*a* issues a request for generation of an imaging job 1026 to the job generator 800. In step S5013, in accordance with the request from the image conversion job 1001*a*, the job generator 800 generates the imaging job 1026 and sends data indicating the handle of the generated imaging job 1026 to the image conversion job 1001*a*.

By using this handle, the image conversion job 1001*a* starts the generated imaging job 1026 (S5014).

The image conversion job 1001*a* performs the image conversion by controlling the input image agent job 1003, the imaging job 1026, and the output image agent job 1003', generated in the above-described manner.

Thereafter, the protocol interpreter 701 registers binders forming the job in the image conversion job 1001*a*, (S5015). After completion of registration of the binders in the image conversion job 1001*a*, the image conversion job 1001*a* registers the binders in the output image agent job 1003' (S5016).

If the binders are registered in the output image agent job 1003', the output image agent job 1003' produces an output image agent binder 1004' in step S5017. In step S5018, the output image agent job 1003' starts the output image agent binder 1004'.

If the output image agent binder 1004' is started by the output image agent job 1003', the output image agent binder 1004' produces a binder for use in storing attribute information in the document manager 900 (S5019). Thereafter, the output image agent binder 1004' notifies the output image agent job 1003' that registration of binders is completed (S5020).

If the output image agent job 1003' receives, from the output image agent binder 1004', the notification indicating that the registration of binders is completed, the output image agent job 1003' notifies the image conversion job 1001*a* that the registration of the binders is completed (S5021). In response to receiving the notification, the image conversion job 1001*a* registers the binders in the input image agent job 1003 (S5022).

After completion of the registration of the binders in the input image agent job 1003, the input image agent job 1003 produces an input image agent binder 1004 in step S5023. In step S5024, the input image agent job 1003 starts the input image agent binder 1004.

If registration of binders is completed, the input image agent binder 1004 notifies the input image agent job 1003 that the registration of binders is competed (S5025).

If the input image agent job 1003 receives, from the input image agent binder 1004, the notification indicating that the registration of binders is completed, the input image agent job 1003 notifies the image conversion job 1001*a* that the registration of the binders is completed (S5026). In response to receiving the notification, the image conversion job 1001*a* registers the binders in the imaging job 1026 (S5027).

Thereafter, the protocol interpreter 701 registers documents forming the binder in the image conversion job 1001*a* (S5028). If registration of the documents in the image conversion job 1001*a* is completed, the image conversion job 1001*a* registers the documents in the output image agent job 1003' (S5029), and the output image agent job 1003' registers the document in the output image agent binder 1004' (S5030).

If the registration of the documents in the output image agent binder 1004' is completed, the output image agent binder 1003' produces an output image agent document 1005' (S5031), and the output image agent document 1005' produces an image document 1011' (S5032).

The output image agent document 1005' implements settings associated with the produced image document 1011' in terms of reading of image data, such as the reading order (ascending order or descending order), or designation of pages to be printed (specific pages, or all pages) (S5033).

Thereafter, the output image agent binder 1004' starts the output image agent document 1005' (S5034). In response, the output image agent document 1005' starts the image document 1011' (S5035).

If the image document 1011' is started by the output image agent document 1005', the image document 1011' produces a document for use in storing attribute information in the document manager 900 (S5036).

In step S5037, the image document 1011' notifies the output image agent document 1005' that the document has been started. The notification of the start of the document is sent from the output agent document 1005' to the output image agent binder 1004' in step S5038, from the output image agent binder 1004' to the output image agent job 1003' in step S5039, and from the output image agent job 1003' to the image conversion job 1001*a* in step S5040.

If the image conversion job 1001*a* receives the notification indicating that the output document has been started, the image conversion job 1001*a* registers the document in the input image agent job 1003 (S5041).

If the document is registered in the input image agent job 1003, the input image agent job 1003 registers the document in the input image agent binder 1004 (S5042).

If the document is registered in the input image agent binder 1004, the input image agent binder 1003 produces an input image agent document 1005 (S5043), and the input image agent document 1005 produces an image document 1011 (S5044).

The input image agent document 1005 implements settings in terms of writing of image data in the image document 1011 (S5045). Thereafter, the input image agent binder 1004 starts the input image agent document 1005 (S5046), and the input image agent document 1005 starts the image document 1011 (S5047).

If the image document 1011 is started, the image document 1011 notifies the input image document 1005 that the document has been started (S5048). The notification of the start of the document is sent from the input image agent document 1005 to the input image agent binder 1004 in step S5049, from the input image agent binder 1004 to the input image agent job 1003 in step S5050, and from the input image agent job 1003 to the image conversion job 1001*a* in step S5051.

In response to receiving the notification, the image conversion job 1001*a* registers the document in the imaging job 1026 (S5052). When the document is registered herein, the imaging job 1026 is also notified that the image document 1011 is specified as the input document and the image document 1011' is specified as the output document.

If the document is registered in the imaging job 1026, the imaging job 1026 implements settings in terms of reading image data from the image document 1011 specified as the input document (S5053) and implements settings in terms of writing image data into the image document 1011' specified as the output document (S5054).

Thereafter, the imaging job 1026 produces a document processor (image→image) 1027 wherein the image document 1011 is specified as the input document and the image document 1011' is specified as the output document (S5055). After completion of producing the document processor (image→image) 1027, the imaging job 1026 starts the document processor (image→image) 1027 to perform the image conversion (S5056).

In the above process, information indicating the storage location at which the image data is stored is supplied to the image page (not shown in the figure) so that the image data can be read from the image storage unit 160 via the document manager 900 on the basis of the supplied information.

Thereafter, the protocol interpreter 701 sends a document end command to the image conversion job 1001*a* in step S5057 and further sends a binder end command in step S5058.

If the image conversion job 1001*a* receives the document end command, the image conversion job 1001*a* issues a binder end command to the output image agent job 1003' (S5059).

In response to receiving the binder end command, the output image agent job 1003' notifies the output image agent binder 1004' that there is no more documents to be registered (S5060).

If the output image agent binder 1004' is notified that registration of documents is completed, the output image agent binder 1004' notifies the output image agent job 1003' that all binders have been established (S5061). The output image agent job 1003' notifies the image conversion job 1001*a* that the binders have been established (S5062).

If the image conversion job 1001*a* is notified that the binders have been established, the image conversion job 1001*a* notifies the input image agent job 1003 that the binders have been established (S5063).

If the input image agent job 1003 is notified that the binders have been established, the input image agent job 1003 notifies the input image agent binder 1004 that there is no more document to be registered (S5064).

In response to receiving the notification indicating that registration of documents is completed, the input image agent binder 1004 notifies the input image agent job 1003 that the binders have been established (S5065). The input image agent job 1003 notifies the image conversion job 1001*a* that the binders have been established (S5066).

In response to the notification, the image conversion job 1001*a* notifies the imaging job 1026 that the binders have been established (S5067).

Thereafter, the protocol interpreter 701 notifies the image conversion job 1001*a* that the job script has been ended (S5068). In response to receiving the notification of the end of the job script, the image conversion job 1001*a* notifies the output image agent job 1003' that the job script has been ended (S5069). If the output image agent job 1003' receives the notification of the end of the job script, the output image agent job 1003' notifies the image conversion job 1001*a* that the job has been established (S5070).

If the image conversion job 1001*a* receives the notification of the establishment of the job, the image conversion job 1001*a* notifies the input image agent job 1003 that the job script has been ended (S5071). If the input image agent job 1003 receives the notification of the end of the job script, the input image agent job 1003 notifies the image conversion job 1001*a* that the job has been established (S5072). In response to receiving the notification, the image conversion job 1001*a* notifies the imaging job 1026 that the job script has been ended (S5073).

On the other hand, if storing of image data in the image conversion process started in step S5056 is completed, the output image document 1011' stores attribute information associated with the resultant image data into the document manager 900 (S5074). If storing of the attribute information is completed, the output image agent document 1005' is notified that storing of the attribute information is completed (S5075).

In response to receiving the notification of the completion of storing of the attribute information, the output image agent document 1005' notifies the output image agent binder 1004' that storing of the attribute information is completed (S5076). In response, the output image agent binder 1004' stores attribute information associated with the binder into the document manger 900 (S5077).

After completion of storing the attribute information associated with the binder, the output image agent binder 1004' notifies the output image agent job 1003' that storing of the attribute information is completed (S5078).

In response, the output image agent job 1003' stores attribute information into the document manager 900 (S5079). After completion of storing the attribute information, the output image agent job 1003' notifies the image conversion job 1001*a* that storing of the attribute information is completed (S5080).

In response, the image conversion job 1001*a* notifies the protocol interpreter 701 that the reading is completed (S5081).

The protocol interpreter notifies the external job issuer (i.e., a host computer on the network or the operation control unit) that the scanning is completed. This makes it possible for the job issuer to recognize that the converted image data has been stored and to know where the converted image data is stored.

Via the process described above, image data read by the scanner can be converted into preview image data. The obtained preview image data is stored in the image storage unit 160 via the document manger 900. A preview image of a desired image data can be displayed in the preview image display screen by specifying the storage location thereof.

The manner of dealing with document data obtained via the reading process in the binding reading mode performed by the reader unit 200 has been described above. When document data to be printed is received from a host computer 601 or the like, the document data may be dealt with in a similar manner. That is, the image processing apparatus may have an input-all-first mode in which the controller controls the inputting of document data to be printed from the host computer 601 or the like in a similar manner to the binding reading mode. However, in this case, "document data" and "image data" in the flow charts shown in FIGS. 8, 9, and 10 should be considered as "data to be printed", and "read" should be considered as "input from the host computer".

Referring to a memory map shown in FIG. 20, data processing programs that are read and executed by the image processing apparatus according to the present invention are described below.

FIG. 20 is a diagram showing a memory map of a storage medium in which various data processing programs are stored in a manner readable by the image processing apparatus according to the present invention.

Although not shown in FIG. 20, in some cases, information necessary for management of the programs stored in the storage medium, such as information indicating versions of programs or names of authors of programs, is also stored in the storage medium. Furthermore, information such as icons for identifying the respective programs, depending on the OS executed on the electronic device that reads the programs, may also be stored in the storage medium.

Furthermore, data associated with the respective programs are stored and managed in directories in the storage medium. Also, in some cases, a program used to install a program onto a computer is also stored in the storage medium. In a case in which a program to be installed onto the computer is stored in a compressed fashion, a program used to decompress the program is also stored.

The functions or the capabilities described above with reference to FIGS. 8 to 10 may be implemented by programs installed from the outside onto a host computer. In such a case, the present invention can be applied to a system in which information including such programs is supplied to an output device from a storage medium such as a CD-ROM, flash memory, or floppy disk (FD) or from an external storage medium via a network.

The objects of the present invention may also be achieved by supplying a storage medium, on which a software program implementing the functions of any of the embodiments described above is stored, to a system or an apparatus whereby a computer (CPU or MPU) in the system or apparatus reads and executes the program code stored on the storage medium.

In this case, it should be understood that the program code read from the storage medium implements the functions of invention and thus the storage medium storing the program code falls within the scope of present invention.

Specific examples of storage media that can be preferably employed in the present invention to supply the program code include a floppy disk, hard disk, optical disk, magneto-optical disk, CD-ROM, CD-R, magnetic tape, nonvolatile memory card, ROM, and EEPROM.

Furthermore, the scope of the present invention includes not only such an apparatus in which the functions of any embodiment described above is implemented simply by reading and executing a program code on a computer but also an apparatus in which a part of or the whole of process is performed by a OS (operating system) running on the computer in accordance with the program code.

Furthermore, the scope of the present invention also includes an apparatus/system in which a program code is transferred once from a storage medium into a memory provided in a function extension board inserted in a computer or provided in a function extension unit connected to the computer, and then a part of or the whole of process is performed by a CPU or the like in the function extension board or the function extension unit in accordance with the program code thereby implementing the functions of any embodiment described above.

Although the present invention has been described above with reference to preferred embodiments, the present invention is not limited to those specific embodiments described above, but various modifications, including combinations of embodiments, are possible.

For example, the present invention may also be implemented in aspects described below.

Aspect 1. An image processing apparatus comprising image reading means (i.e., the scanning unit 210 shown in FIG. 1) for reading one page of a document or sequentially scanning a plurality of pages of a document and producing image data thereof, image storage means (i.e., the image storage unit 160 shown in FIG. 1) for storing the image data read by the image reading means, document management means for managing the image data stored in the image storage means, print means (i.e., the printer unit 300 shown in FIG. 1) for printing particular image data managed by the document management means, mode setting means (i.e., the operation control unit 150 shown in FIG. 1) for setting various modes. The image processing apparatus further comprising reading means (i.e., the controller 110 shown in FIG. 1) for reading all document pages first by repeating a process of reading one or more document pages at a time using the image reading means and storing the resultant image data into the image storage means, preview image display means for producing preview image data corresponding to image data obtained via the process of reading all document pages and stored in the image storage means and displaying the produced preview image data on a display, and document re-reading means (i.e., the controller 110 shown in FIG. 1) for discarding a selected page of image data displayed on the image display means and inserting image data of a document page re-read by the image reading means at the page location at which the discarded page of the image data was stored.

Aspect 2. An image processing apparatus according to aspect 1, wherein the preview image display means performs a particular conversion on the image data and displays a preview image of the resultant image data on the display.

Aspect 3. An image processing apparatus according to aspect 1, wherein the image reading means includes a number-of-sheets control means for controlling the reading operation such that a specified number of document sheets are sequentially fed from a document set placed on the automatic document feeder (DF) and image data there of is read.

Aspect 4. An image processing apparatus according to aspect 1, wherein the document management means manages image data and attribute information thereof stored in a storage device in unit of folders, jobs, binders, documents and pages, and wherein each folder manages one or more jobs, each job manages one or more binders, each binder manages one or more documents, and each document manages one or more pages.

Aspect 5. An image processing apparatus according to aspect 1, further comprising protocol interpretation means for interpreting a protocol according to an operation command, job generation means for generating a job to be processed in accordance with the interpretation performed by the protocol interpretation means, and job processing means for processing the job generated by the job generation means.

Aspect 6. An image processing apparatus according to aspect 5, wherein the job processing means comprises job management means (i.e., the job manager 811 shown in FIG. 12) for managing information associated with the entirety of a job and controlling execution of processing associated with the entirety of the job, binder management means (i.e., the binder manager 812 shown in FIG. 12) for managing information associated with a binder and controlling execution of processing associated with the binder, document management means (i.e., the document manager 813 shown in FIG. 12) for managing information associated with a document and controlling execution of processing associated with the document, generation means (i.e., the document processor 820 shown in FIG. 12) for generating a document, document processing means for processing the document generated by the document generation means, page generation means (i.e., the page processor 830 shown in FIG. 12) for dividing the document generated by the document generation means into pages, page processing means (i.e., the page processor 830 shown in FIG. 12) for processing a page generated by the page generation means, band generation means (i.e., the band processor 840 shown in FIG. 12) for dividing the page generated by the page generation means into bands, band processing means (i.e., the band processor 840 shown in FIG. 12) for processing the bands generated by the band generation means, and device allocation means (i.e., the device allocator 850 shown in FIG. 12) for arbitrating requests for usage of a device necessary in execution of the job.

Aspect 7. An image processing apparatus according to aspect 6, wherein the job generated by the job generator includes one or more binders, each binder includes one or more documents, each document includes one or more pages, and each page includes one or more bands.

Aspect 8. An image processing apparatus according to aspect 6, wherein the document processing means determines processing to be performed in accordance with a determined format of input data and a determined format of output data.

Aspect 9. An image processing apparatus according to aspect 6, wherein the page processing means determines processing to be performed in accordance with a determined format of input data and a determined format of output data.

Aspect 10. An image processing apparatus according to aspect 6, wherein the band processing means determines processing to be performed in accordance with a determined format of input data and a determined format of output data.

Aspect 11. An image processing method for an image processing apparatus comprising image reading means for scanning one page of a document or sequentially scanning a plurality of pages of a document and producing image data thereof, image storage means for storing the image data produced by the image reading means, document management means for managing the image data stored in the image storage means, print means for printing particular image data managed by the document management means, and setting means for setting various modes, wherein the image processing method comprising the steps of a reading step (step S1004 in FIG. 8) of reading all document pages first by repeating a process of reading one or more document pages at a time using the image reading means and storing the resultant image data into the image storage means, a preview image display step (step S1005 in FIG. 8) of producing preview image data corresponding to image data obtained via the reading step of reading all document pages and stored in the image storage means and displaying the produced preview image data on a display, and a document re-reading step (step S1006 shown in FIG. 8) for discarding a selected page of image data displayed on preview image display means and inserting image data of a document page re-read by the image reading means at the page location at which the discarded page of the image data was stored.

Aspect 12. An image processing method according to aspect 11, wherein the step of displaying scanned image date includes the steps of performing a predetermined conversion on the image data and displaying a preview image of the resultant image data on the display.

Aspect 13. An image processing method according to aspect 11, further comprising the step of specifying the number of document sheets to be fed from a set of document sheets placed on an automatic document feeder (DF).

Aspect 14. An image processing method according to aspect 11, wherein the document management means manages image data and attribute information thereof stored in a storage device in unit of folders, jobs, binders, documents pages, each folder manages one or more jobs, each job manages one or more binders, each binder manages one or more documents, each document manages one or more pages.

Aspect 15. An image processing method according to aspect 11, further comprising the steps of interpreting a protocol according to an operation command, generating a job to be processed in accordance with the interpretation performed in the protocol interpretation step, and processing the job generated in the job generation step.

Aspect 16. An image processing method according to aspect 15, wherein the job processing step (step S4003 and the following steps shown in FIG. 16) includes a job management step (step S4010 and the following steps performed by the image agent job 1003 shown in FIG. 16, step S4004 and the following steps performed by the scan job 1002, and step S4007 and the following steps performed by the print job 1006) of managing information associated with the entirety of a job and controlling execution of processing associated with the entirety of the job; a binder management step (step S4017, step S4010 and the following steps performed by the image agent binder 1004 shown in FIG. 16, and steep S4097 and the following steps performed by the print binder 1007) of managing information associated with a binder and controlling execution of processing associated with the binder, a document management step (step S4027 and the following steps performed by the image agent document 1005 shown in FIG. 16, and step S4100 performed by the print document 1008) of managing information associated with a document and controlling execution of processing associated with the document, a document generation step (steps S4028, S4037, and S4102 shown in FIG. 16) of generating a document, a document processing step (steps S4030, S4040, and S4105 shown in FIG. 16) of processing the document generated in the document generation step, a page generation step of dividing the document generated in the document generation step into pages, a page processing step of processing a page generated in the page generation step, a band generation step of dividing the page generated in the page generation step into band, a band processing step of processing a band generated in the band generation step, and a device allocation step of arbitrating requests for usage of a device necessary in execution of the job.

Aspect 17. An image processing method according to aspect 16, wherein the job generated in the job generation step includes one or more binders, each binder includes one or more documents, each document includes one or more pages, and each page includes one or more bands.

Aspect 18. An image processing method according to aspect 16, wherein the document processing step includes the step of determining processing to be performed is determined in accordance with a determined format of input data and a determined format of output data.

Aspect 19. An image processing method according to aspect 16, wherein the page processing step includes the step of determining processing to be performed is determined in accordance with a determined format of input data and a determined format of output data.

Aspect 20. An image processing method according to aspect 16, wherein the band processing step includes the step of determining processing to be performed is determined in accordance with a determined format of input data and a determined format of output data.

Aspect 21. A computer-readable storage medium on which a program for implementing an image processing method in one of Aspects 11 to 20 is stored.

Aspect 22. A program for implementing an image processing method in one of Aspects 11 to 20.

According to the embodiments or the aspects described above, image data can be previewed even in the middle of the process of reading document pages in the binding reading mode in which reading a smaller number of document sheets than the maximum number of sheets allowed to be placed on the document tray is performed repeatedly until all pages of a given set of document sheets have been read. If an error is detected in a preview image corresponding to a particular page of image data, only that particular page is re-read without having to re-read all pages. In this technique, because an error can be detected before reading is completed for all pages, a drastic improvement in operation efficiency is achieved. Furthermore, it is not necessary to perform test printing to confirm that reading of image data has been correctly performed, and thus printing paper is not wasted.

As described above, according to the present invention, it is possible to preview image data even in the middle of the process of reading document pages in the binding reading mode in which reading a smaller number of document sheets than the maximum number of sheets allowed to be placed on the document tray is performed repeatedly until all pages of a given set of document sheets have been read. If a particular page of image data has an error, the error can be easily detected from a corresponding preview image, and the particular page can be easily re-read. The particular page of image data having the error is discarded and the image data obtained by re-reading is inserted in the place of the discarded page. After completion of re-reading, reading of the remaining pages of document can be continued in the binding reading mode. This leads to a drastic improvement in operation efficiency. That is, the present invention provides an excellent operational environment in which reading of document sheets is performed in a flexible and highly efficient manner depending on the requirement issued by a user.

In another embodiment of the present invention, the interval during which the reading operation is suspended, preview images are displayed, and the reading operation is resumed can be established via manual means. For example, a "Suspend" button would be provided on the user interface of FIG. 5, wherein selection of this button by a user would result in suspension of the reading operation and the user would be provided the option of displaying preview images. A "Resume" button would be provided on the user interface of FIG. 5, wherein selection of this button by a user would result in resumption of the reading operation. Any other means of manually suspending the reading operation, displaying preview images, and resuming the reading operation that would enable practice of the present invention is applicable.

It is to be understood that the phraseology or terminology employed herein is for the purpose of description and not of limitation. While the invention has been described with reference to the structures disclosed herein, it is not confined to the details set forth and this application is intended to cover such modifications or changes as may come within the purposes of the improvements or the scope of the following claims.

What is claimed is:

1. An image processing apparatus comprising:
a scanner unit configured to scan a document sheet;

a display unit configured to display an image corresponding to the document sheet scanned by the scanner unit;
an output unit configured to output the image corresponding to the document sheet scanned by the scanner unit;
a control unit configured to cause the scanner unit to scan a first set of document sheets in accordance with receiving a first instruction, and cause the scanner unit to scan a second set of document sheets in accordance with receiving a second instruction, and cause the output unit to output the image corresponding to the scanned first set of document sheets and the image corresponding to the scanned second set of document sheets in accordance with receiving a third instruction; and
a display control unit configured to enable the display unit to display, in response to completion of scanning each of plural sets of document sheets including the first set of document sheets and the second set of document sheets, the image corresponding to each of the plural sets of document sheets.

2. The image processing apparatus according to claim 1,
wherein the display control unit enables the display unit to display, in response to completion of scanning the first set of document sheets, the image corresponding to the first set of document sheets, and
wherein the display control unit enables the display unit to display, in response to completion of scanning the second set of document sheets, the image corresponding to the first set of document sheets and the second set of document sheets.

3. The image processing apparatus according to claim 2, wherein the control unit enables the display unit to display the image before receiving the third instruction.

4. The image processing apparatus according to claim 2, wherein the control unit enables the display unit to display the image corresponding to the first set of document sheets after completion of scanning the first set of document sheets and before beginning of scanning the second set of document sheets.

5. The image processing apparatus according to claim 2, wherein the control unit enables the display unit to display the image in accordance with receiving a display instruction from a user after completion of scanning the first set of document sheets and before beginning of scanning the second set of document sheets.

6. The image processing apparatus according to claim 1, further comprising:
a re-scan unit configured to cause the scanner unit to re-scan a document and replace an image currently displayed on the display unit with an image corresponding to the document sheet scanned by the re-scanning.

7. The image processing apparatus according to claim 5, wherein in response to completion of scanning the first set of document sheets, inputting of the display instruction is enabled.

8. The image processing apparatus according to claim 3, wherein in response to completion of scanning the first set of document sheets, inputting of the third instruction is enabled.

9. The image processing apparatus according to claim 6, wherein a re-scan instruction is allowed to be input to re-scan a document by the scanner unit and replace the image currently displayed on the display unit with an image corresponding to the document sheet scanned by the re-scanning.

10. The image processing apparatus according to claim 1, further comprising:
a suspending instruction receiving unit configured to receive a suspending instruction,
wherein the control unit deletes, in accordance with receiving the suspending instruction after completion of scanning the first set of document sheets, the image corresponding to scanned first set of document sheets.

11. The image processing apparatus according to claim 1, wherein the first instruction, the second instruction and the third instruction are received via an operation panel of the image processing apparatus.

12. The image processing apparatus according to claim 1, further comprising:
an automatic document feeder,
wherein the control unit causes the scanner unit to scan the first set of document sheets fed from the automatic document feeder in accordance with receiving the first instruction, and causes the scanner unit to scan the second set of document sheets fed from the automatic document feeder in accordance with receiving the second instruction.

13. A control method for controlling an image processing apparatus, comprising:
causing a scanner unit to scan a first set of document sheets in accordance with receiving a first instruction;
causing the scanner unit to scan a second set of document sheets in accordance with a second instruction;
causing an output unit to output image corresponding to the scanned first set of document sheets and image corresponding to the scanned second set of document sheets in accordance with receiving a third instruction; and
enabling a display unit to display, in response to completion of scanning each of plural sets of document sheets including the first set of document sheets and the second document sheets, the image corresponding to the scanned set of document sheets.

14. The control method according to claim 13,
wherein displaying of the image corresponding to the first set of document sheets by the display unit is enabled in response to completion of scanning the first set of document sheets, and
displaying of the image corresponding to the first set of document sheets and the second set of document sheets by the display unit is enabled in response to completion of scanning the second set of document sheets.

15. The control method according to claim 14,
wherein displaying of the image by the display unit is enabled before receiving the third instruction.

16. The control method according to claim 14, wherein displaying of the image by the display unit is enabled after completion of scanning the first set of document sheets and before beginning of scanning the second set of document sheets.

17. The control method according to claim 14, wherein displaying of the image by the display unit is performed in accordance with receiving a display instruction from a user after completion of scanning the first set of document sheets and before beginning of scanning the second document sheets.

18. The control method according to claim 13, further comprising:
causing the scanner unit to re-scan a document; and
replacing an image currently displayed on the display unit with an image corresponding to the document sheet scanned by the re-scanning.

19. The control method according to claim 17, wherein in response to completion of scanning the first set of document sheets, inputting of the display instruction is enabled.

20. The control method according to claim 15, wherein in response to scanning of the first set document sheets, inputting of the display instruction is enabled.

21. The control method according to claim 18, wherein a re-scan instruction is enabled to be input to re-scan a document by the scanner unit and replace the image currently displayed on the display unit with an image corresponding to the document sheet scanned by the re-scanning.

22. The control method according to claim 13, further comprising:
   receiving a suspending instruction; and
   deleting, in accordance with receiving the suspending instruction after completion of scanning the first set of document sheets, the image corresponding to scanned first set of document sheets.

23. A computer readable medium having computer executable instructions for implementing the control method according to claim 13.

24. A computer readable medium having computer executable instructions for implementing the control method according to claim 14.

25. A computer readable medium having computer executable instructions for implementing the control method according to claim 15.

26. A computer readable medium having computer executable instructions for implementing the control method according to claim 16.

27. A computer readable medium having computer executable instructions for implementing the control method according to claim 17.

28. A computer readable medium having computer executable instructions for implementing the control method according to claim 18.

29. A computer readable medium having computer executable instructions for implementing the control method according to claim 19.

30. A computer readable medium having computer executable instructions for implementing the control method according to claim 20.

31. A computer readable medium having computer executable instructions for implementing the control method according to claim 21.

32. A computer readable medium having computer executable instructions for implementing the control method according to claim 22.

33. An image processing apparatus comprising:
   a control unit configured to cause a scanner unit to scan a first document sheet in accordance with receiving a first instruction, and cause the scanner unit to scan a second document sheet in accordance with receiving a second instruction, and cause an output unit to output the image corresponding to the scanned first document sheet and the image corresponding to the scanned second document sheet in accordance with receiving a third instruction; and
   a display control unit configured to enable a display unit to display, in response to completion of scanning each of plural document sheets including the first document sheet and the second document sheet, the image corresponding to each of the plural document sheets.

* * * * *